United States Patent [19]
Wormer

[11] Patent Number: 4,823,712
[45] Date of Patent: Apr. 25, 1989

[54] MULTIFUEL BUBBLING BED FLUIDIZED BED COMBUSTOR SYSTEM

[75] Inventor: Alex F. Wormer, Marblehead, Mass.

[73] Assignee: Wormser Engineering, Inc., Woburn, Mass.

[21] Appl. No.: 193,152

[22] Filed: May 5, 1988

Related U.S. Application Data

[62] Division of Ser. No. 810,424, Dec. 18, 1985, abandoned.

[51] Int. Cl.$^4$ ................................................ F23G 7/00
[52] U.S. Cl. .................................... 110/245; 110/263; 122/4 D
[58] Field of Search .................. 110/245, 263, 258; 122/40; 431/7, 170; 165/104.16; 432/15, 58; 34/57 A; 60/39, 464

[56] References Cited

U.S. PATENT DOCUMENTS

| | | | |
|---|---|---|---|
| 2,471,119 | 5/1949 | Peck et al. | 202/6 |
| 2,506,307 | 5/1950 | Martin | 196/52 |
| 2,518,693 | 8/1950 | Jahnig | 196/52 |
| 2,608,526 | 8/1952 | Rex | 196/56 |
| 2,657,124 | 10/1953 | Gaucher | 48/197 |
| 2,684,931 | 7/1954 | Berg | 196/52 |
| 2,793,104 | 5/1957 | Rees | 48/197 |
| 2,799,359 | 7/1957 | Johnson | 183/114.2 |
| 2,807,571 | 9/1957 | Murphy et al. | 202/14 |
| 2,844,525 | 7/1958 | Scott, Jr. et al. | 202/14 |

OTHER PUBLICATIONS

"Pyrolisis of Municipal Solid Waste," Proceedings of 1984 National Waste Processing Conference, Jun. 1984, pp. 272–281.
Seven Page Japanese Document, Denoted "A9," relating to the Pyrox System for Funabashi City.
Three Page Japanese Document, Denoted "A10."
Two Page Japanese Document, Denoted "A11."

(List continued on next page.)

"Gasifier Improves Waste Fuel Quality," Coal & Synfuels Technology, Sep. 9, 1985, pp. 4–5.

Primary Examiner—Steven E. Warner
Attorney, Agent, or Firm—Weingarten, Schurgin, Gagnebin & Hayes

[57] ABSTRACT

In order to be able to handle multiple fuels in a bubbling-bed fluidized bed combustor, a number of elements are combined together and a number of systems are described which utilize these elements in order to be able to appropriately process different types of fuels. With respect to the handling of multiple fuels by a bubbling-bed fluidized bed combustor which need not be reconfigured for each type of fuel, the combustor in the subject invention is provided with a closely-coupled pyrolyzer or gasifier. The close-coupled pyrolyzer not only permits the processing of virtually any type of fuel into two fuel streams which are immediately usable by the combustor but also has certain advantages in terms of reducing environmental pollutants. The above-mentioned close-coupled pyrolyzer also results in improved performance aside from the pollution aspects mentioned above. The close coupling of the pyrolyzer to the fluidized bed combustor also allows fluid bed combustion systems to be built in larger capacity than heretofore possible. In one aspect of the subject invention, the close-coupled pyrolyzer permits the production of higher temperature flue gases than would be done with a fluidized bed combustor without the pyrolyzer. The subject invention also allows the use of high-moisture fuels and avoids the efficiency loss, output loss and the increased boiler size that is normally associated with those fuels. The above advantages of the close-coupled pyrolyzer are improved by the provision of some specially designed auxiliary apparatus, such as a specialized deep-bed pyrolyzer, a specialized screw feeding system and the utilization of under-the-bed cooling tubes in a fluidized bed combustor. The above has detailed the building blocks useful in numerous types of systems, three of which will be described hereinafter; namely, a system for processing refuse-derived fuels, a system for processing hazardous fuels and combined-cycle gas.

5 Claims, 10 Drawing Sheets

U.S. PATENT DOCUMENTS

| | | | |
|---|---|---|---|
| 3,039,955 | 6/1962 | Honnold, Jr. | 208/132 |
| 3,152,245 | 10/1964 | Litman | 219/433 |
| 3,281,349 | 10/1966 | Evans | 209/11 |
| 3,297,562 | 1/1967 | Biddick et al. | 208/11 |
| 3,501,394 | 3/1970 | Lyons | 208/11 |
| 3,617,468 | 11/1971 | Reyburn et al. | 208/11 |
| 3,663,421 | 5/1972 | Parr | 208/8 |
| 3,703,052 | 11/1972 | Linden | 48/215 |
| 3,803,021 | 4/1974 | Abdul-Rahman | 208/11 |
| 3,803,022 | 4/1974 | Abdul-Rahman | 208/11 |
| 3,855,070 | 12/1974 | Squires | 201/23 |
| 3,893,426 | 7/1975 | Bryers | 122/4 D |
| 3,976,558 | 8/1976 | Hall | 208/11 |
| 3,980,439 | 9/1976 | Mayer | 23/284 |
| 4,052,172 | 10/1977 | Shirakawa et al. | 48/197 |
| 4,064,018 | 12/1977 | Choi | 201/12 |
| 4,087,347 | 5/1978 | Longlois et al. | 208/11 |
| 4,110,193 | 8/1978 | Gwyn et al. | 208/11 |
| 4,125,453 | 11/1978 | Tamm et al. | 208/11 |
| 4,133,739 | 1/1979 | Mitchell et al. | 208/8 |
| 4,137,053 | 1/1979 | Mitchell et al. | 48/197 |
| 4,141,794 | 2/1979 | Choi | 201/12 |
| 4,148,710 | 4/1979 | Burton | 208/11 |
| 4,152,245 | 5/1979 | Abdul-Rahman | 208/11 |
| 4,157,245 | 6/1979 | Mitchell et al. | 48/197 |
| 4,183,800 | 1/1980 | Mitchell et al. | 208/11 |
| 4,199,432 | 4/1980 | Tamm et al. | 208/8 |
| 4,244,305 | 1/1981 | Kawano et al. | 110/245 |
| 4,253,409 | 3/1981 | Wormser | 110/263 X |
| 4,308,810 | 1/1982 | Taylor | 122/4 D |
| 4,325,327 | 4/1982 | Kantesaria et al. | 110/245 X |
| 4,343,247 | 8/1982 | Chronowski | 122/4 D X |
| 4,424,766 | 1/1984 | Boyle | 122/4 D |
| 4,432,290 | 2/1984 | Ishii et al. | 122/4 D X |
| 4,435,148 | 3/1984 | Moss | 122/4 D X |
| 4,437,416 | 3/1984 | Ishii et al. | 110/245 |
| 4,469,050 | 9/1984 | Korenberg | 122/4 D |
| 4,476,790 | 10/1984 | Borio et al. | 122/4 D X |
| 4,495,857 | 2/1985 | Wormser | 122/4 D |
| 4,511,434 | 4/1985 | Vasalos | 202/99 |

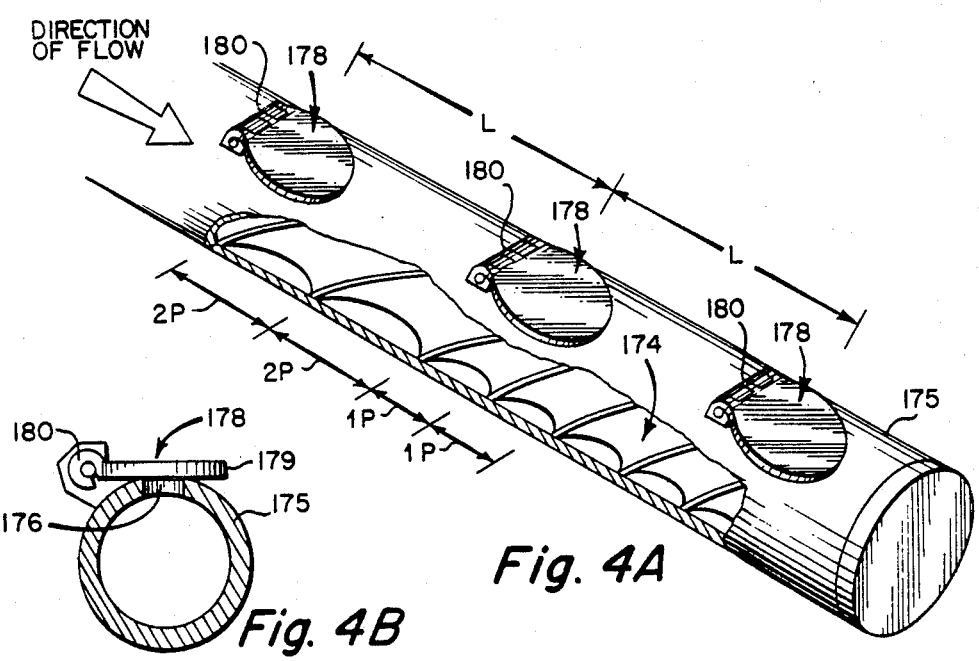
Fig. 4A
Fig. 4B
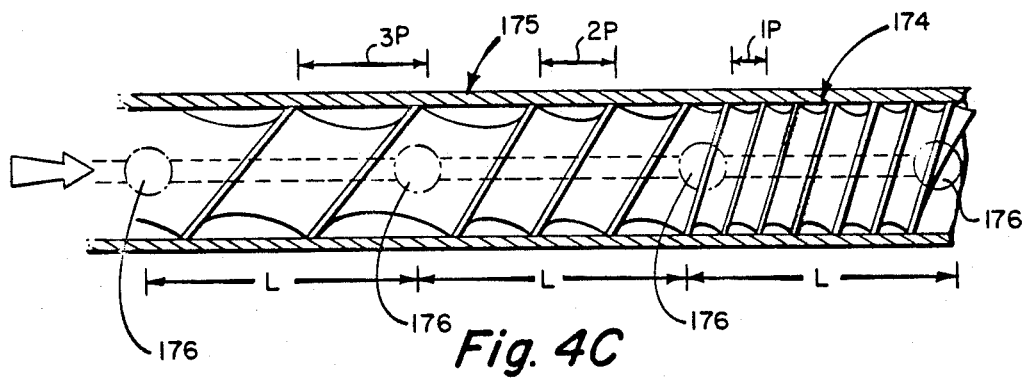
Fig. 4C
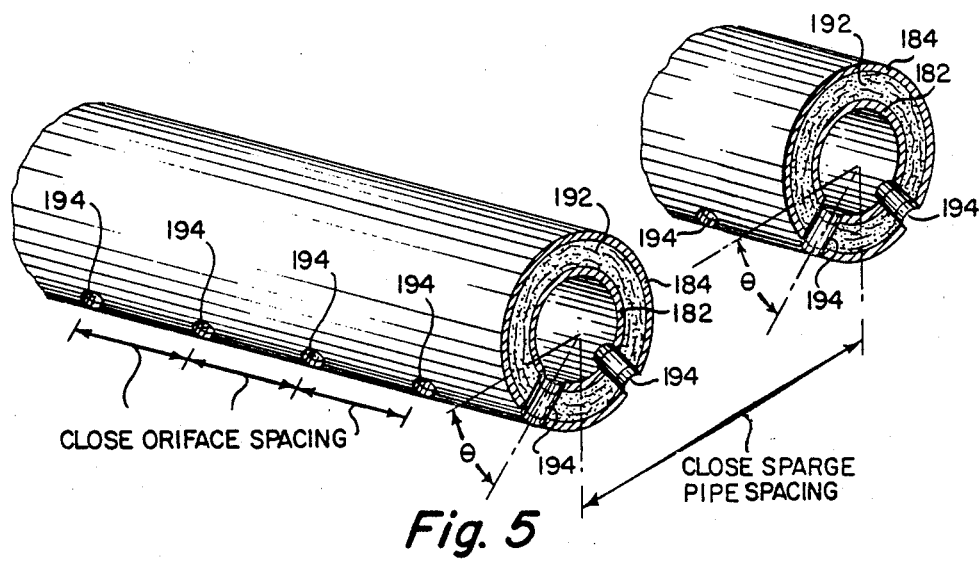
Fig. 5

MULTIFUEL BUBBLING BED FLUIDIZED BED COMBUSTOR SYSTEM

The application is a division of application Ser. No. 810,424, filed Dec. 18, 1985, now abandoned.

FIELD OF INVENTION

This invention relates to providing multifuel capability for a fluidized bed combustor and related methods and apparatus for combusting low-BTU fuels and generating high-temperature gases while reducing environmental pollutants.

BACKGROUND OF THE INVENTION

Bubbling-bed fluidized bed combustors are capable of burning a wide variety of fuels, but not all at once. For example, volatile fuels, such as plastics, and lightweight fuels, such as paper or refuse-derived fuel (RDF) fluff, which comes from municipal solid waste, tend to float at the surface of the combustion bed instead of mixing into it, as with ordinary fuels. This causes above-the-bed combustion that is accompanied by unacceptably high temperatures above the bed, while cooling the bed itself, perhaps below the ignition point, and in any case, reducing the combustion efficiency.

To burn such fuels within the bed, special low-density bed materials have to be used or, more commonly, the fuel is densified by such processes as pelletizing, at significant added cost.

Gaseous fuels and very fine fuels, such as sawdust and pulverized coal, also require special provisions. Unlike coarse solid fuels which are spread across the bed by its motion, gaseous and fine fuels blow straight out of the bed above the fuel injection points, forming fuel-rich flame spouts above the bed. As with the low-density fuels, the above-the-bed flames create unacceptably high temperatures above the bed and unacceptably low temperatures in the bed. The fuel-rich spouts can also contribute to air pollutant emissions and reduced combustion efficiency. As a result, gaseous and fine fuels can be efficiently burned only if the spacing between the fuel injection points is made very small, on the order of a few inches, which requires a great multiplicity of feedpoints.

The combustion of liquid fuels, such as residual oils, also requires a multiplicity of feedpoints for similar reasons. In addition, the injectors must be specially designed to prevent the dripping of the oil onto the distributor plate where it would agglomerate.

Furthermore, the size of the piping and nozzles for injecting gaseous fuels is necessarily different from that of liquid or solid fuels due to the wide differences in the densities of the fluids. Thus, separate fuel feed systems are required for each fuel, there being no possibility of a universal fuel feed system which can handle all types of fuel.

Solid fuels create additional problems. The performance of coal fired fluidized bed combustors is best when the coal is injected pneumatically at a multiplicity of under-the-bed feed pipes. But such systems require that the coal must be prepared before it can be conveyed to the combustors. Such preparation includes metering, crushing, drying, and then accurately splitting the coal flow into a number of streams, all at added cost.

Other solid fuels, such as wood chips, are generally too large to fit through the coal pipes and require yet other preparation, transmission and injection systems. Other non-solid fuels, such as sludges, slurries or sticky fuels, such as tars, also need customized fuel handling and injections systems.

As a result, bubbling-bed fluidized bed combustors tend to be designed for only a single type of fuel, or perhaps a limited number of fuels. In contrast, circulating-bed fluidized bed combustors have been able to overcome this problem by injecting any of a wide variety of fuels into a stream of circulating solids, using only a few types of injections and feedpoints.

It is the purpose of the present invention to give the bubbling-bed fluidized bed combustor the same or better capability without incurring the very tall height, and its associated cost, of the circulating-bed fluidized bed combustors. As will be seen, this is accomplished by providing the combustor with universal feed systems, including gas sparge pipes for volatiles and conveyors for coarse materials, with the pyrolzer serving as a fuel processor to provide only appropriate gaseous and coarse fuel streams.

A second limitation of bubbling-bed fluidized bed combustors relates to performance, such as air pollutant emissions and combustion efficiency. In particular, the emissions of oxides of nitrogen and carbon monoxide are not as low as those of the circulating-bed fluidized bed combustors, and combustion efficiency is generally somewhat lower.

A third limitation of coal-fired bubbling-bed fluidized bed combustors relates to their maximum feasible size. The under-the-bed coal feed pipes that are needed to maximize the performance of the bubbling-bed fluidized bed combustors are regarded as high maintenance devices because they are subject to erosion and clogging. Several hundred such pipes are required with a utility-size combustor, which is considered impractical, and the requirement for such a large number of feed pipes has inhibited the use of bubbling-bed fluidized bed combustors in the larger size.

A fourth limitation of fluidized bed combustors is their relatively low operating temperature, established by the need to avoid the slagging of the ash in the fuel. Applications exist for which it would be attractive to achieve somewhat higher temperatures than are feasible in fluidized bed combustors, while retaining the use of such fluidized bed features as "in situ" pollution control. Such applications include combined-cycle (gas turbine-steam turbine) cogeneration plants, hazardous waste incinerators and high-temperature industrial furnaces.

More particularly, as illustrated in U.S. Pat. Nos. 4,135,885, 4,279,205, 4,279,207, 4,303,023, and 4,499,857, and assigned to the Assignee hereof, all of said patents being incorporated herein by reference, multiple-bed combustors are illustrated in which coal is burned and in which certain improvements in control and efficiency are described, with the earliest of these patents, U.S. Pat. No. 4,135,885, describing a dual-bed chemical reactor for burning and desulfurizing coal that has a first upstream fluid bed which primarily burns the coal and a downstream fluid bed which desulfurizes. While these combustors work exceptionally well for use with coal, they must be substantially reconfigured with any other type of raw fuel to be used.

While the above patents summarize effective techniques for the burning of coal in fluidized bed combustors as mentioned above, there is an increased need for the combustion of other fuels, such as waste coal, petroleum coke, refuse-derived fuel (RDF), sewage sludge, wood (including sawdust), industrial waste (including plastics and paper), peat, tar, oil, gas (including low-BTU gas), shredded tires, liquates and agricultural wastes (including bagasse, rice hulls and peanut shells as examples). These fuels have BTU contents of 2,000-22,000 BTU/lb and maximum ash and moisture contents of 85%. The adaptability of fluid bed combustion furnaces to process such a variety of fuels often necessitates complete reconfiguration of the furnaces to adapt them to the particular fuel to be burned.

In the past, pyrolyzers have been used to process raw fuel to evolve gases to be used to raise the temperature of flue gases emerging from fluidized bed combustors. Such systems described in other patents assigned to the Assignee hereof which deal with coal-burning arrangements are U.S. Pat. Nos. 4,051,791 and 4,253,409, with the above patents being related to discharge of char and combustion materials in the form of gases to a fluidized bed in the form of a gaseous refined state. Note that in these patents, the pyrolzers require a separate heat source.

SUMMARY OF THE INVENTION

In order to be able to handle multiple fuels in a bubbling-bed fluidized bed combustor, a number of elements are combined together and a number of systems are described which utilize these elements in order to be able to appropriately process different types of fuels.

With respect to the handling of multiple fuels by a bubbling-bed fluidized bed combustor which need not be reconfigured for each type of fuel, the combustor in the subject invention is provided with a closely-coupled pyrolyzer or gasifier. The close-coupled pyrolyzer not only permits the processing of virtually any type of fuel into two fuel streams which are immediately usable by the combustor but also has certain advantages in terms of reducing environmental pollutants. The above-mentioned close-coupled pyrolyzer also results in improved performance aside from the pollution aspects mentioned above. The close coupling of the pyrolyzer to the fluidized bed combustor also allows fluid bed combustion systems to be built in larger capacity than heretofore possible. In one aspect of the subject invention, the close-coupled pyrolyzer permits the production of higher temperature flue gases than would be done with a fluidized bed combustor without the pyrolyzer.

The subject invention also allows the use of high-moisture fuels and avoids the efficiency loss, output loss and the increased boiler size that is normally associated with those fuels. The above advantages of the close-coupled pyrolyzer are improved by the provision of some specially designed auxiliary apparatus, such as a specialized deep-bed pyrolyzer, a specialized screw feeding system and the utilization of under-the-bed cooling tubes in a fluidized bed combustor. The above has detailed the building blocks useful in numerous types of systems, three of which will be described hereinafter; namely, a system for processing refuse-derived fuels, a system for processing hazardous fuels and combined-cycle gas turbine systems. Within these particular systems are two elements which contribute to the operation of the systems; namely for wet fuels, the utilization of specialized drier fed by the combustion bed materials from the fluidized bed combustor and, with respect to high-temperature combined-cycle systems and hazardous fuel combustors, the utilization of an afterburner which utilizes the output of the pyrolyzer as well as the output of the combustor to provide for very high-temperature flue gases.

BRIEF DESCRIPTION OF DRAWINGS

These and other objects of the subject invention will be better understood when taken in conjunction with the Detailed Description in view of the drawings, of which:

FIGS. 4A-4C show a schematic view of a solids conveyor;

FIG. 5 is a sectional view of a fuel sparge pipe for use in the combustor of FIGS. 1 and 2;

DETAILED DESCRIPTION

Close-coupled Pyrolyzer

As will be described, in order to solve the problems associated with delivery of different types of fuel to a fluid bed combustor, a bubbling-bed fluidized bed combustor is provided with multifuel capability by the addition of a close-coupled pyrolyzer as a fuel-processing device that converts a wide variety of fuels into forms that can be burned in a fluidized bed combustor without the use of customized fuel preparation or feed systems. The pyrolyzer converts raw fuel into two forms immediately usable by the combustor without reconfiguring the fuel feed to the combustor; namely, volatile fuels capable of under-bed injection through a gas injection via array of under-bed sparge pipes having closely-spaced injection points spaced laterally across the bed, and coarse fuel from the pyrolyzer bed injected through either over-bed or under-bed conveyors. Heat for the pyrolysis is derived from combustor bed solids injected into the pyrolyzer bed, with the use of the sensible heat from combustor bed solids as the principal pyrolyzer heat source permitting independent pyrolyzer temperature control, fuel flexibility, temperature gradient reduction, the use of easily sized bed material and reductions in overall pyrolyzer size.

Figure 1:
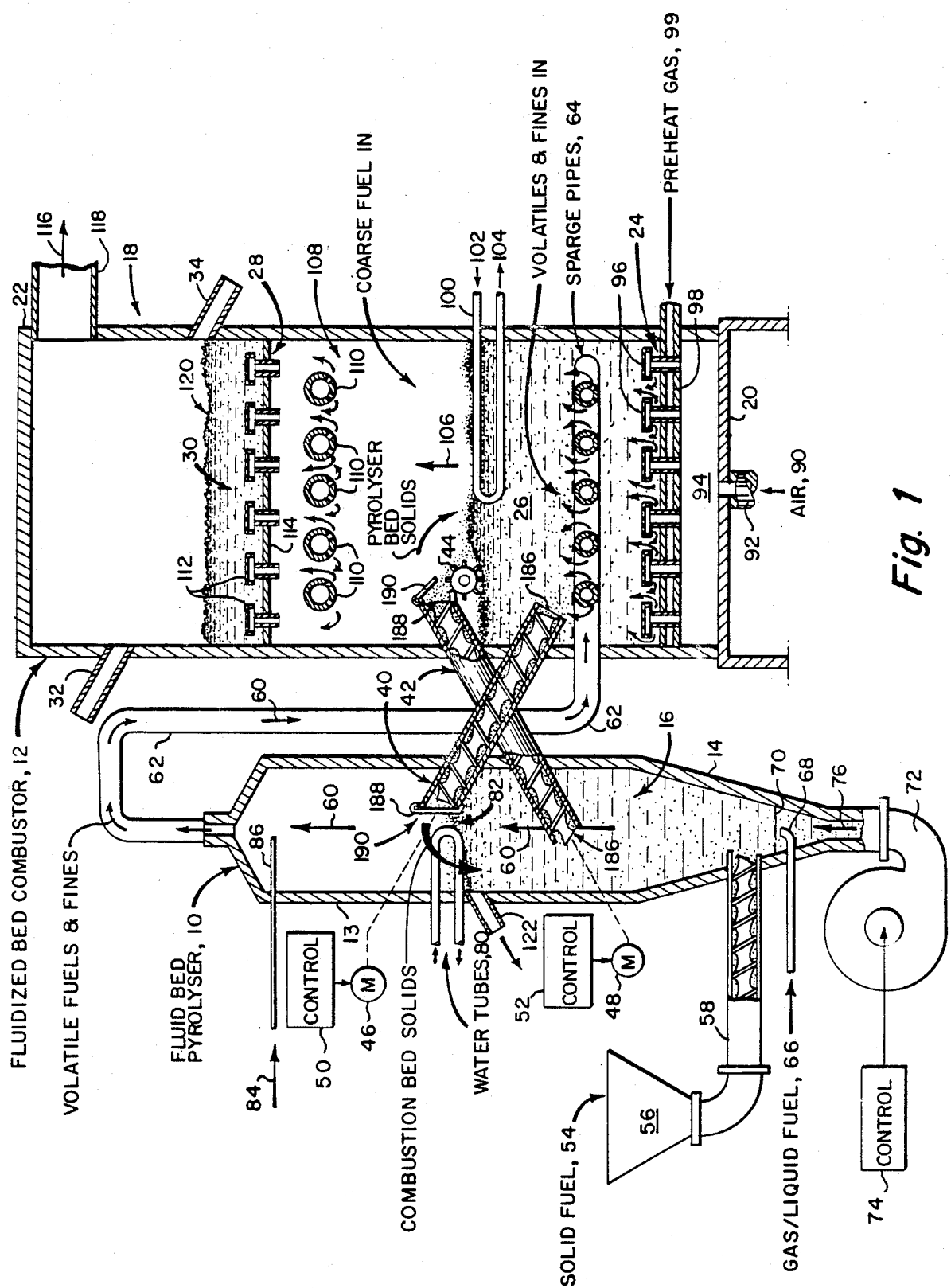
FIG. 1 is a schematic view of the subject invention showing a bubbling-bed fluidized bed combustor closely coupled to a fluidized bed pyrolyzer.

Referring now to FIG. 1, a schematic diagram of the subject system is shown which, in one embodiment, includes a fluidized bed pyrolyzer 10 coupled to fluidized bed combustor 12. Pyrolyzer 10 consists of cylindrical casing 13 with conical bottom 14 containing a bed of solids 16. Combustor 12 consists of rectangular casing 18, having a bottom panel 20 and top panel 22, which together form a gas-tight vessel. Within combustor 12 are water-cooled distributor plate 24 on which is placed a bed of sand 26 where combustion occurs, and water-cooled distributor plate 28 on which is placed a bed of sorbent 30 where desulfurization occurs. Fresh sorbent is admitted though pipe 32, whereas spent sorbent exits pipe 34.

Bed solids are circulated between the two fluidized beds by conveyors 40 and 42. The circulating flow is in two parts. First, solids from combustion bed 26, consisting mostly of hot 20-mesh sand, are transferred to the pyrolyzer bed 16 by conveyor 40. There they mix with the contents of pyrolyzer bed 16, giving up heat in the process. Second, bed solids are transferred from pyrolyzer 10 to the combustor 12 by screw conveyor 42, where they are distributed across combustion bed 26 by spreader 44. These solids are mixed by bed action into combustion bed 26. Note that conveyors 40 and 42 are driven by motors 46 and 48, respectively, under control of control units 50 and 52, as illustrated.

The fuel flow through the system is as follows. Solid fuel 54 is added at pressurized hopper 56, conveyed to the pyrolyzer by feedscrew 58, and is converted into either char or volatiles in pyrolyzer bed 16. Char too coarse to be elutriated from the pyrolyzer remains with pyrolyzer bed solids 16 and is conveyed with the pyrolyzer bed solids to the combustion bed by screw conveyor 42 where it is eventually burned. Volatiles 60, including entrained char fines, leave the pyrolyzer through duct 62 and enter the combustion bed 26 at sparge pipes 64, where they are burned.

The solid fuel 54 fed at pressurized hopper 56 preferably have previously been crushed to a maximum particle size of a quarter inch to avoid the build-up of oversized ash particles that would accumulate in the bed and defluidize it. If the fuel feed 54 is to contain larger particles, some of which may be incombustible, bed clean-out systems are required in both the pyrolyzer and the combustion bed. In addition, it may be desirable to employ a bed-material screening system that cools the bed material, screens out the oversized materials and returns the remaining material to one of the beds. Systems for providing oversized particle clean-out from fluidized beds and for screening bed materials from fluidized beds are both known to the art.

Liquid fuels 66 are added at spray nozzle 68 whose flow is directed at the bottom surface 70 of bed 16. The bottom surface 70 is created by the flow of pyrolysis air from blower 72 under control of unit 74 passing at high velocity through the narrow bottom of pyrolyzer cone 14. Gaseous fuels are injected at a nozzle similar to oil nozzle 68 but of larger size. After entering the pyrolyzer, these fuels follow the same path through the system as do the volatiles 60 in the case of the solid fuels.

With respect to the pyrolyzer 10, pyrolysis air 76 for fluidizing the pyrolyzer bed 16 and maintaining the correct velocities for classifying the solids is provided by pyrolysis air blower 72. Water tubes 80 are located in the splash zone 82 at the top of bed 16 to cool it, if necessary. Such cooling may be required to keep the bed within its prescribed temperature limits when low-volatile fuels such as petroleum coke are used. The amount of heat absorbed by tubes 80 can be controlled by adjusting the amount of material in the bed, and it can be reduced to negligible levels by dropping the bed level sufficiently. Reducing pyrolyzer temperature is accomplished by adding additional bed material to cover more tubes so that more heat is removed. Removal of bed material exposes more tubes to raise the pyrolyzer temperature.

The temperature of the volatiles 60 leaving the pyrolyzer may be adjusted by the addition of fluid 84 at injector 86. If cooling is required, the preferable fluid 84 is water, which allows the pyrolyzer bed to be operated at the high temperatures required for the efficient control of nitrogen oxides, typically 1,600° F., while providing the low temperatures (under 1,300° F.) needed to avoid corrosion (by sulfide attack) and fouling (by ash heated above its sintering temperature) in the sparge pipes. It will, however, be appreciated that high pyrolyzer-bed temperatures may also be desirable for maximizing the volatiles yield of fuel for high-temperature applications in which an afterburner (not shown) is used.

Under other circumstances, such as a start-up or at low loads, it may be desirable to heat volatiles 60, This is done by adding air at injector 86, which increases the temperature of the volatiles by partial combustion. Heating of the volatiles may be required to avoid the possible condensation of the volatiles in the piping downstream of the pyrolyzer.

With regard to the combustor 12, except for the elements noted above, the combustor is similar to the multi-bed fluidized bed combustor described in the above-mentioned patents. Combustion air 90 provided by a blower (not shown) enters the fluidized bed combustor at entrance 92, flows through plenum 94 and enters the combustion bed 26 through the bubble caps 96 in distributor plate 98. Combustion occurs in bed 26, and heat is removed by horizontal steam tubes 100 into which a stream of cooling water 102 is pumped, and from which a water-steam mixture 104 emerges.

The steam-water mixture 104 circulates through a conventional steam loop that typically includes a drum, steam turbine and/or process heater, feedwater treatment plant and feedwater pump, deaerator and circulator pump, among others.

Flue gases 106 leave the combustion bed 26 at combustion bed freeboard 108. Seconary air is added at secondary air injectors 110, allowing the completion of combustion of unburned hydrocarbons and carbon monoxide. The flue gases then pass through the bubble caps 112 of the desulfurizing bed distributor 114 before entering desulfurizing bed 30. There the flue gases are desulfurized (if necessary) by sand (20-mesh limestone or dolomite).

From there, the flue gases 116 leave the combustor 12 at outlet duct 118 and pass through a heat exchanger, which may contain one or more of the following conventional elements, depending on the application: superheater, boiler, economiser and air heater. The gases are then ducted to a fabric filter where the ash is filtered out and removed to landfill. The gases then pass through an induced draft fan and to the stack. All of the elements beyond outlet duct 118 are conventional with coal-fired boilers.

The desulfurizing bed 30 level 120 is kept constant by use of overflow pipe 34, from which desulfurizing bed material is removed to a cooler (not shown) for disposal. An overflow 122 is also used to prevent the build-up of bed solids in the combustion bed and pyrolyzer beds, should such a build-up occur, as may be the case with high-ash fuels. With low-ash systems, no such build-up generally occurs, as the ash becomes ground up by bed motion and removed overhead as flyash, leaving with the flue gases 116. This ash is eventually captured in the fabric filter downstream of the heat exchanger.

Figure 2:
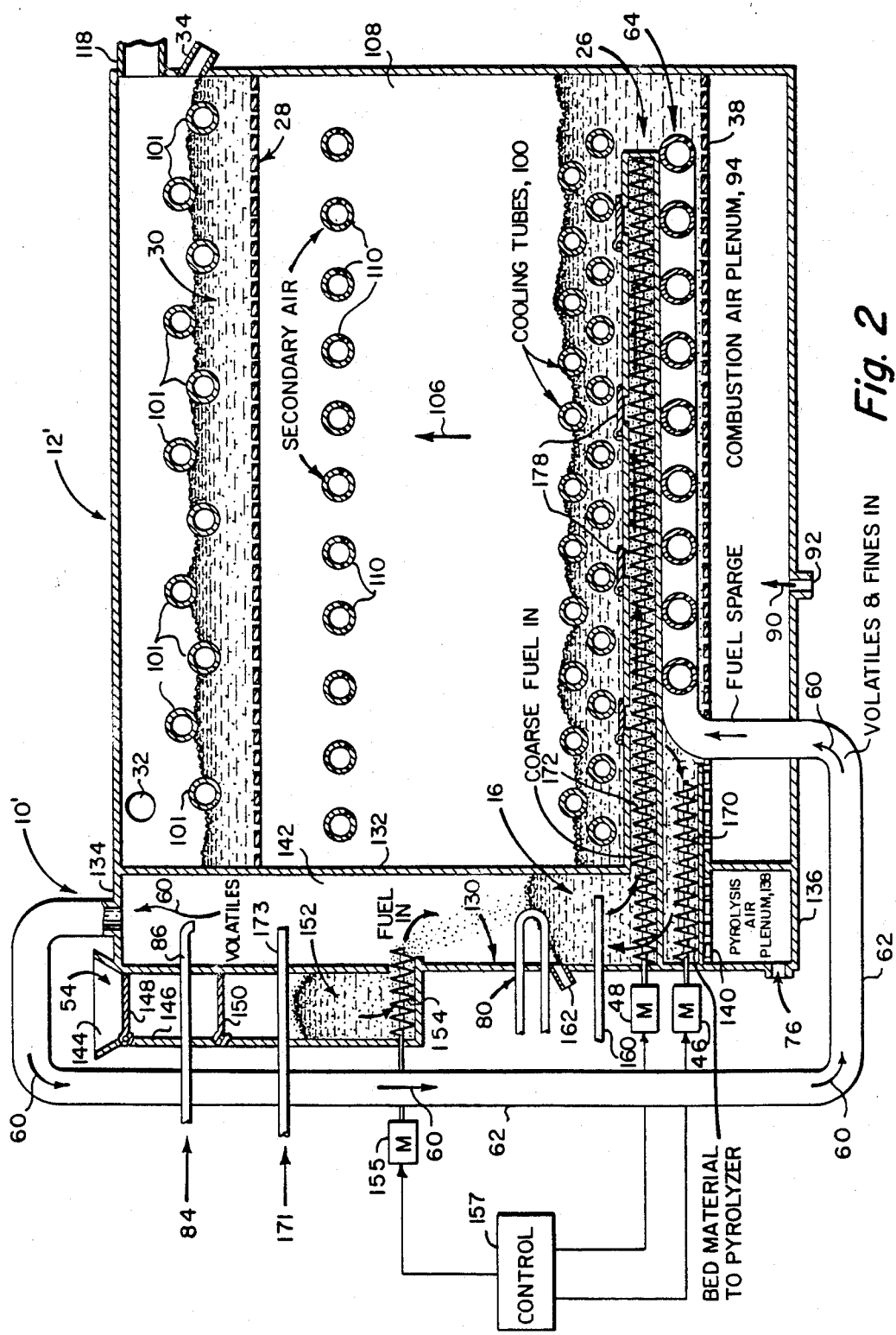
FIG. 2 is a diagrammatic view of a preferred embodiment of the subject invention showing an integral shallow-bed pyrolyzer.

FIG. 2 shows a preferred embodiment of the subject invention. FIG. 2 elements bear like reference characters to corresponding elements to FIG. 1 except as noted.

Pyrolyzer 10' in FIG. 2 employs a shallow-bed fluidized bed instead of the deep-bed pyrolyzer 10 depicted in FIG. 1. A shallow-bed pyrolyzer employs a bed depth of only a few inches instead of the bed depth of many feet used in the deep-bed design. Also, the shallow-bed pyrolyzer 10' is of uniform width for its entire depth vs. the conical shape of the deep-bed pyrolyzer 10.

Shallow-bed pyrolyzer 10' includes rectangular casing 130 that is adjacent to fluidized bed combustor 12' and is separated from it by wall 132, top 134, bottom 136, which together form a gas-tight vessel. Within pyrolyzer 10' is an air plenum 138 into which pyrolysis air 76 is blown. Forming the top surface of plenum 138 is the water-cooled pyrolyzer distributor plate 140 which forms the lower surface of bed 16. Located near the top surface of bed 16 are cooling tubes 80 through which water is pumped. These tubes perform the same function as tubes 80 in FIG. 1. Above bed 16 is freeboard space 142 through which volatiles 60 pass, including entrained char fines. The volatiles 60 are then ducted through pipe 62 to combustor 12' where they are injected into combustion bed 26 through sparge pipes 64.

Solid fuel 54 is fed to the pyrolyzer through lockhopper assembly 144, consisting of gas-tight casing 146 containing a gas-tight upper door 148, gas-tight lower door 150, fuel storage zone 152 and fuel metering device 154, such as a screw conveyor driven by motor 155 under control of unit 157 which also controls motors 46 and 48. Fuels suitable for feeding into pyrolyzer 10' include solids of ordinary density, including coal, wood, peat, petroleum coke, rubber, as well as low-density fuels such as paper, agricultural wastes such as rice hulls and bagasse, and refuse-derived fuels.

Also suitable are wet or fine fuels that form into large agglomerates, including sludges, mine tailings, slurries and tars, and also volatile fuels, such as plastics. Liquid fuels and extremely finely-divided fuels, such as pulverized coal, may be used if they are pumped or pneumatically conveyed into pyrolyzer 10' at spray bars 160 located just above distributor 140. Gases may be fed at orifices within distributor 140. The only fuels that are unsuitable are those containing a predominance of finely-divided particles, specifically, between 35 mesh and 200 mesh.

Solid fuels 54 are preferably crushed to under a quarter inch for the same reasons as those described under the discussion of fuel sizing for the design of FIG. 1. Excess bed material caused by the presence of high amounts of ash in the fuel is removed from the system at overflow pipe 162, with the remainder of the ash being removed overhead as flyash, as with the design of FIG. 1.

Combustion bed solids, consisting mostly of sand, are transmitted to the pyrolyzer bed 16 from the combustion bed 26 by one or more conveyors shown as conveyor 170. Pyrolyzer bed solids, consisting of combustion bed solids and the coarse char generated at the pyrolyzer, are transmitted to the combustion bed 26 by one or more conveyors 172.

As illustrated in FIGS. 4A–4C, one or more specialized conveyors are used to transmit solids to the combustion bed and inject them uniformly into the bed, consisting of a screw conveyor 174 in a conduit 175 that has several outlet ports 176, each of which injects an equal amount of pyrolyzer bed solids into the bed. Each outlet port 176 is covered with a check valve 178 of a flapper design with a lid 179 hinged at 180 to conduit 175. This check valve assures that the screw is always full of solids. The fluting of the conveyor is of varying pitch, with the downstream sections being of progressively shorter pitch, as shown by equal length sections.

This provides for a uniform volumetric flow of solids from each outlet port. In one embodiment, the pitch of the screw is the constant between any two holes. As can be seen from FIGS. 4A and 4C, the pitch of the screw flutes in any section is $N \times P$, where N is the number of holes before the last or most downstream hole, and P is the pitch of the flutes between the last and next-to-the-last holes. Both the casing and the screw may be of a cooled design, if that is required for durability.

Thus, with respect to the conveyor that conveys pyrolyzer bed solids to the combustor bed in an under-bed location, the screw conveyor is so configured that equal amounts of material are spread out at equally spaced intervals within the combustor bed. This is accomplished by increasing the pitch of the flutes of the screw conveyor in the direction of motion of the material which is conveyed such that a larger number of flutes or unit length occurs at the far end of the conveyor vis-a-vis the near end of the conveyor. In order that all of the material not be immediately dispersed at the upstream end, the conveyor has a tubular conduit construction in which outlet orifices equally spaced along the top side of the conduit are provided with check valves in the form of flappers to maintain the screw conveyor conduit filled with bed solids from the pyrolyzer. This conveyor is most frequently used when the solids from the pyrolyzer are to be injected within the combustor bed and provides a unique method of assuring that there is even distribution of pyrolyzer bed solids and thus coarse fuel across the extent of the combustor bed.

Note, in one embodiment, as seen in FIG. 1, the conveyors used to transmit solids to the pyrolyzer bed are also screw conveyors each with a single inlet 186 and a single outlet 188. A check valve 190 at outlet of conveyor 40 is required to avoid the higher gas pressures that exist in the pyrolyzer from blocking or reversing the flow of solids in the screw. It may also be water cooled. A similar check valve 190 is used in the combustor at the outlet of conveyor 42.

Referring to FIG. 5, a portion of the array of sparge pipes 64 matrix used to distribute the volatiles into the combustion bed is illustrated. Since all of the fuel is broken down by the close-coupled pyrolyzer into coarse fuels delivered elsewhere and volatiles distributed by sparge pipe 64, the sparge pipe configuration need not be varied for different fuels. As can be seen from FIG. 5, the sparge pipes have an inner conduit 182, an outer conduit 184 and insulation 192 therebetween.

Insulation 192 is provided to prevent overheating of the sparge pipe, thereby minimizing corrosion, erosion and fouling. The outlet orifices 194 communicate with the interior of conduit 182 and pass through insulation 192. Note that the orifices are closely spaced and are pointed downward, preferably at an angle of 30° to the horizontal, to prevent the pipes from filling up with bed material when there is no flow through the sparge pipes. The pipes are manifolded so as to extend across the bed so that gas is injected in and across the bed every few inches. This prevents a single plume and assures equal bed heating.

The fuel sparge pipes are designed as follows. Their internal diameters are selected to provide a moderate velocity, typically 70–100 ft/sec. At higher velocities, the pressure drop and potential for erosion become excessive. At lower velocities, the sparge pipes become too large, interfering with bed fluidization.

The combined area of the orifices is equal to or somewhat less than that of the internal area of the sparge pipe, typically two-thirds to one. Larger orifice diameters result in non-uniformity of flow entering the bed; smaller orifice diameters create excessive pressure drops. The number of orifices is selected to provide sufficient injection points per square foot of bed area. The use of two few orifices creates fuel spouts above the bed, while too many orifices result in small hole diameters that are subject to plugging. The orifices should be staggered and equally spaced to provide uniform distribution across the bed.

The average distance between orifices should be less than the settled bed height, typically half to two-thirds, to prevent over-the-bed fuel spouts. Preferably, the orifices in the fuel sparge pipes are aligned with the orifices in the air distributor to promote mixing. If combustion air sparge pipes are used, both the pipes and their orifices should be aligned.

The fuel sparge pipe should be insulated to protect the metal from corrosion by overheating. The fuel sparge pipes' orifices are located below the pipes' centerlines to keep the pipes from filling with bed material when there is no gas flowing through them.

While none of the above criteria is critical, radical departure from these considerations will create difficulties. The following dimensions for the fuel sparge pipes represent a typical example of the application of the above criteria. Pipe dimensions: 2 inches inside diameter, 3 inches outside diameter (including insulation), 10-foot length (in the bed), on 9-inch centers, with all of the fuel introduced at one end. The orifices are on 8-inch centers in two rows that are located on opposite sides of the pipe and are 30 degrees below the pipe's centerline. This results in four orifices per square foot of bed area. The settled-bed depth is 9 inches above the location of the fuel sparge pipe orifices. The orifices are ¼-inch in diameter.

Thus, the solid-feed fuel piping system of a conventional bubbling-bed system, which is subject to erosion and fouling, is replaced in part by a gaseous-feed piping system in which all raw materials produce volatiles in the close-coupled pyrolyzer which are ducted to a specialized multiple-point across-the-bed sparge pipe matrix in which gas is injected across the bed every few inches instead of at one point or line. In so doing, the volatiles and ducting are not subject to erosion or fouling. Thus, the main objection to the construction of coal-fired, bubbling-bed fluidized bed combustors in large sizes is eliminated.

Operation

Referring again to FIG. 2, beds 26 and 16 are filled with 20-mesh sand or ash to their customary levels of about 9 inches. To start the system, coolant tubes 100 and 80 are provided with water flow by turning on the water circulator pump (not shown). The combustion air blower (not shown) that provides combustion air 90 is turned on, as is the preheat burner (not shown) that heats the combustion air by natural gas or oil to about 1,700° F. The fuel rate of the preheat burner is typically 10–15% of the maximum rated capacity of the fluidized bed combustor. This provides enough flow to fluidize bed 26 during the start-up process but not enough to expand the bed into water tubes 100. Thus, only a minimum of heat is removed from bed 26 by water tubes 100 during start-up.

When bed 26 reaches 800° F., feedscrews 170 and 172 are turned on, and pyrolyzer airflow 76 is provided at a sufficient flow rate to fluidize pyrolyzer bed 16, thus heating the pyrolyzer bed. If necessary, the pyrolyzer air is also preheated with a preheat burner (not shown). Feeding of the normal fuel 54 is then started, which heats the combustion bed to the take-off temperature of 1,200° F. At this point, the preheat burner is shut off, and the temperature of both beds rise to their normal operating temperatures.

During normal operation, the steam output of the system can be modulated as follows:

Steam demand controls combustion airflow 90. As steam demand drops, the combustion air damper is closed. Steam demand may be measured by steam pressure, steam flow or some combination of steam pressure and flow.

The flow rate of fuel 54 is maintained directly proportional to the combustion airflow by use of a proportional controller that changes the feed rate of metering screw 154.

The ratio of fuel flow 54 to airflow 90 is adjusted by use of the stack oxygen meter (not shown) to provide the optimal stack-gas excess air level. The optimal stack-gas air depends on the combustibility of the fuel, with less reactive fuels requiring higher levers of excess air to complete the combustion. Stack-gas excess air levels as low as 5% are used with gas and oil and 20–25% with solid fuels such as coal.

The temperature of combustion bed 26 is adjusted by controlling the amount of bed material. The temperature rises if bed material is removed and drops if bed material is added. This is because if bed material drops, less cooling tubes 100 are contacted by the bed 26, and thus, less heat is removed from the bed. Conversely, if the level of bed 26 is raised, more cooling pipes are contacted by the bed material and more heat is removed, and the temperature of the combustor is reduced. Combustion bed material is preferably obtained from or removed to a storage bed. In the present invention, the most convenient storage bed is pyrolyzer bed 16. Thus, the addition or deletion of material from combustion bed 26 is accomplished by the control of feedscrews 172.

The temperature to which the combustion bed is controlled depends on the following. Below a certain temperature, depending on the fuel but typically 1,500° F., combustion efficiency diminishes, causing increased fuel costs and, with certain fuels, stack-gas odors. If the fuel contains hazardous wastes, such as dioxins, higher temperatures may be required, of at least 1,800° F., to provide for sufficient combustion efficiency of the hazardous waste.

The upper temperature at which the combustion bed may be operated is largely a function of ash fusion temperatures of the fuel. With coal, ash fusion temperatures are in excess of 1,900° F. Fuels containing high concentrations of alkalai in their ash, such as some lignites, can limit the bed to temperatures as low as 1,550° F. to avoid the clinkering of the ash.

The primary airflow 90 is controlled to provide near stoichiometric conditions in order to minimize $NO_x$ emissions. The secondary airflow added at pipes 110 is made sufficient to cool desulfurizing bed 30 to its optimal scrubbing temperature and, in any case, is sufficient to provide the necessary excess air level at outlet 118.

Sorbents, such as dolomite or limestone, are added to the desulfurizing bed 30 at feedpipe 32 at a rate proportional to the fuel rate of fuel 54. The ratio of sorbent-to-fuel feed rate may be fixed, or alternatively, may be controlled with the use of a stack-gas emission monitor.

The depth of desulfurizing bed 30 is controlled by the height of the opening of overflow pipe 34. Normally, a bed depth of 6 to 12 inches is used.

Pyrolysis air 76 flow rate is controlled by a flow meter in freeboard 142 or pipe 62 to provide the optimal fluidization velocity in pyrolyzer bed 16 to classify the char particles. Typically, the superficial velocity of the gases leaving the bed is 3-4 ft/sec higher than that of the combustion bed, or 10-11 ft/sec at the system's rated capacity. The flow rate of pyrolysis air 76 in any case is never allowed to drop below the minimum value required to keep bed 16 fluidized, or approximately 1.5 ft/sec.

The temperature of pyrolyzer bed 16 is controlled by screw conveyor 170, with increases in temperature provided by increases in the rate of the conveyor. In no case is the speed of conveyor 170 to be less than that required to periodically flush pyrolyzer bed 16 with combustion bed material, and thus maintain control over the pyrolyzer bed particle size for adequate fluidization.

The normal temperature set-point for the pyrolyzer bed is 1,000°-1,200° F. At higher temperatures, coolant water 171 must be added at injector 173 to protect the sparge pipes against erosion and fouling even though the addition of coolant water reduces the boiler efficiency somewhat. Higher temperatures may nevertheless be required, as high as 1,600° F., to minimize $NO_x$ emissions or increase the volatiles yield, the latter being used in the high-temperature configurations of the invention. The maximum temperature at which the pyrolyzer may be operated depends on ash fusion considerations.

The minimum set point for the pyrolyzer bed temperature is typically 900° F.; below this, volatiles may start to condense in the piping downstream of the pyrolyzer.

If the temperature of pyrolyzer bed 16 exceeds the desired level, even with conveyor screw 170 operating at its minimal rate, as may occur with low-volatile fuels, the pyrolyzer bed level is raised until the bed makes contact with water tubes 80. Control of the bed level of bed 16 is achieved by shutting of the flow of materials through overflow pipe 162 and, if necessary, adding sand to the system from an external bin.

The temperature of volatiles stream 60 is controlled between the 900° F. and 1,300° F. required by the sparge pipes by the addition of medium 84 added at pipe 86. If stream 60 is to be cooled, water is the medium which is added. If stream 60 is to be heated, air is the medium which is added.

At low steam demands, typically about 33% of the burner's maximum rated capacity, the demand for combustion air flow drops to the minimum allowable level required for adequate fluidization of bed 26.

Below this demand rate, the combustion bed airflow 90 is maintained at its minimum allowable level. To further reduce the generation of steam at bed tubes 100, the bed level is reduced, which causes less contact between the bed and the tubes, and therefore reduces the steam output but also causes the temperature of bed 26 to rise. To solve the overheating problem, the use of the constant fuel-air ratio control loop is abandoned, and the excess air level is allowed to rise sufficient to cool the bed to its set point.

With high-BTU fuels such as coal, excess-air levels as high as 150% can be used while maintaining the minimum combustion bed temperature of 1,600° F. As a result, at the maximum excess air level, the system can be continuously operated at steam loads as low as one-eighth of the maximum rated capacity. Lower-BTU fuel are not able to withstand such high level of excess air while maintaining the minimum combustion temperature, resulting in lesser turndown ratios, but in no case is the overall turndown less than three to one.

As yet lower steam demands, the system is operated in a cycling mode, whereby both fuel and air is cycled on and off as the steam pressure fluctuates between set limits. Flow through the coolant tubes is maintained during shutdowns to protect them from overheating.

Thus, the apparatus described combines a closely-coupled bubbling-bed fluidized bed combustor with a fluidized bed pyrolyzer. Pyrolyzers are devices for heating fuels to drive off their gaseous or vapor components or volatiles. In all cases, the fuel enters the system at the pyrolyzer, whose primary function is to serve as a fuel processor for the combustor.

More specifically, "closely-coupled" means that the combustor and pyrolyzer are connected in two ways. First, bed solids (primarily sand) are transferred by conveyors from the combustion bed to the pyrolyzer bed where they are mixed into the bed and then are conveyed back from the pyrolyzer bed to the combustor bed in a continuous process in which coarse combustible solid fuel from the pyrolyzer is introduced to the combustor bed where it is burned. Secondly, the volatiles and entrained solids generated at the pyrolyzer, consisting mostly of gas, are ducted to and injected into the combustion bed where they are burned.

In one embodiment of the invention, all of the fuel generated at the pyrolyzer is burned at the combustor. In the other embodiment, some of the volatiles are ducted to an afterburner, with the remainder being burned in the combustor. The flue gases leaving the combustor are also ducted to the afterburner where the volatiles are burned and used to raise the temperature of the flue gases before being sent to a furnace or other application.

The fluidized bed combustor used in the invention may be either a single-bed design, wherein combustion and desulfurization occur in a single bed, or of a multi-bed design, wherein combustion occurs primarily in the lower bed and desulfurization occurs in an upper bed. As described before, the latter design is illustrated in aboveidentified U.S. Patents.

Multifuel Capability

By use of the pyrolyzer, any fuel is converted into one of two forms, each of which can be fed to a combustor of a single design, regardless of the properties of the fuel. Without the pyrolyzer, each type of fuel would require a separately designed fuel feed system.

The two forms of fuel generated at the pyrolyzer are volatiles, or fuel in the vapor state; and char, a solid. The occurrence of fuels in the liquid or sticky states, such as oils or tars, is avoided by operating the pyrolyzer at a sufficiently high temperature, generally over 900° F.

The superficial velocity of gases in the pyrolyzer's fluidized bed is controlled to allow it to also behave principally as a char classifier as opposed to a combustor. Classifying the char means that char particles coarser than a prescribed diameter remain with the bed solids, while the finer particles are entrained and removed with the volatiles. The desired superficial velocity is provided first by appropriately sizing the pyrolyzer, then by adding the requisite amount of fluidizing air at the pyrolyzer's fluidizing air distributor. Note that in one embodiment, combustion is prevented in the pyrolyzer by limiting the oxygen supply, whereas in another embodiments, just enough air is injected to provide a small amount of combustion to raise the temperature of the outgoing volatiles.

The char fines and volatiles are injected into the combustion bed at fuel sparge pipes which are perforated pipes that inject the fuel into the bed at very closely-spaced intervals of only a few inches. Both pipes and the orifices within each pipe are only a few inches apart. Thus, only one universal sparge pipe configuration for volatile fuel feed is required which means that the combustor need not be reconfigured for each type of fuel.

Without closely-spaced injection, both the volatiles and fuel fines would form fuel spouts that would largely burn over the bed. Sparge pipes are efficient at uniformly distributing fluids, such as volatiles and their entrained fuel fines, but are unsuitable for injecting coarse materials, such as bed material, due to the erosion and flow maldistribution that would occur. However, the burnable char is delivered to the combustor by the movement of pyrolyzer bed material to the combustor bed. Although this is done with screw conveyors, unlike volatiles, the manner of coarse fuel delivery to the combustor bed is non-critical.

Thus, as an aspect of the subject invention, the pyrolyzer bed solids, including the coarse char, are conveyed to the pyrolyzer bed and then returned to the combustion bed by mechanical screws or spreaders. Such injectors are relatively poor with regard to the uniformity with which they distribute the fuel across the bed. Non-uniform distribution of fuels is detrimental with gaseous or fine fuels, as has been described above. With coarse fuels, however, poor distribution by the injectors is not a problem as the fuels burn relatively slowly, providing enough time for the motion of the fluidized bed to distribute the fuel uniformly across the bed.

The operation of the pyrolyzer as a classifier thus prevents both undesirable effects: the inclusion of too-fine char particles into the bed solids return system and the inclusion of too-coarse char particles in the sparge pipes.

It should be noted that the heat required to bring the incoming fuel to pyrolyzing temperature in conventional pyrolyzers is generally provided by the partial oxidation of the fuel, generated by adding some air to the heated pyrolyzer. However, in the present invention, most of the heat for heating the incoming fuel is provided by the combustion bed solids transferred to the pyrolyzer from the combustor bed, with just enough air being added to provide the required fluidization and superficial velocity in the pyrolyzer. Thus, very little, if any, combustion occurs in the pyrolyzer unless such is desirable, as will be described.

The reasons for using combustion bed solids as the principal source of heat in the pyrolyzer, rather than partial oxidation, have to do with temperature control, fuel flexibility, removal of temperature gradients, bed particle size, which is easy to control, and reduction of pyrolyzer bed area.

With respect to temperature control, in a partial-oxidation pyrolyzer, the amount of pyrolysis air is used to control the pyrolyzer temperature. This requirement is at odds with the need in the present invention to use pyrolysis air to control the superficial velocity to classify the char. Use of the combustion bed solids as the source of heat provides a way to give independent control over pyrolyzer temperature and superficial velocity and avoids the need to compromise on either one.

With respect to fuel flexibility, fuels vary very widely with regard to their volatile content, ranging from only a few percent for anthracite coal and petroleum coke to virtually 100% for fuel oil. The emission of volatiles in the fluid bed pyrolyzer contributes significantly to the superficial velocity, with the pyrolysis air being controlled to furnish whatever additional gas flow is required to create the desired superficial velocity for char classification.

The need to deal with the widely varying fuel volatilities that are encountered in a multifuel combustion system adds another constraint in the use of pyrolyzing air and would make it yet more difficult to control the pyrolyzer bed temperature (at the specified superficial velocity) if a flow of combustion bed solids were not also available.

A third reason for using combustion bed solids as the primary source of heat for the pyrolyzer rather than partial oxidation relates to the temperature gradients that are created with partial oxidation when fuels that float on the surface of a fluidized bed are used, such as plastics, paper and RDF. Just as fluidized bed combustors work poorly with such fuels, so do partial-oxidation pyrolyzers and for the same reason, namely that most of the reaction occurs in the freeboard, causing excessive temperatures there and insufficient temperatures in the bed.

Use of the combustion bed solids as the primary source of heat avids this problem because the pyrolyzer bed and its fuels are heated by mixing and thermal conduction with the incoming combustion bed solid, which provides very effective heat transfer rather than by radiation from the over-the-bed flames, which is very ineffective.

With respect to particle size control, another reason for the use of circulating bed solids between the two beds relates to the quality of fluidization in the pyrolyzer. Satisfactory fluidization of a fluidized bed occurs only when the particles are within prescribed diameter limits: too-small particles blow out of the bed while the use of too-coarse particles results in a sluggish bed or one that will not fluidize at all.

Use of the circulated bed material between combustor and pyrolyzer allows most of the pyrolyzer bed material to be sand, whose particle size is easy to control and is stable. Without a solids circulation system, the size of the particles in the pyrolyzer would instead be determined by the size of the incoming fuel particles, which would then have to be carefully sized by fuel preparation equipment. This adds considerably to the cost and complexity of a multifuel system.

With respect to volatiles BTU content, the volatiles' heat content, in BTU/cu ft, is about twice as high if combustion bed solids are used as the source of pyrolyzer heat instead of partial oxidation. This reduces the pyrolyzer bed area by half and overall volume by as much as two-thirds, reducing its cost.

Performance

With respect to oxides of nitrogen, use of the close-coupled pyrolyzer to condition the fuel provides a pretreatment of the fuel nitrogen which significantly reduces the amount of $NO_x$ emissions. To minimize stack emissions of $NO_x$, the following procedure is used.

The pyrolyzer is operated at as a high a temperature as feasible, preferably at 1,600° F. or above. The volatiles are then burned in the fluidized bed combustor, preferably at stoichiometric or substoichiometric conditions. Over-fire air is added in the combustion bed freeboard to provide the excess air condition that is needed to complete the combustion of the carbon monoxide and other unburned fuels there.

The reasons that NO emissions are minimized by these methods is as follows. First, heating of the fuel in the pyrolyzer thermally decomposes the fuel-nitrogen compounds into intermediate products, chiefly hydrogen cyanide and ammonia, whose later combustion predominantly forms molecular nitrogen. Without the pre-treatment, if the fuel were burned in an excess-air mode, as occurs near the distributor of a conventional fluidized bed combustor, a significantly larger fraction of the fuel-nitrogen emerges as NO.

Secondly, by minimizing the amount of air that is added at the pyrolyzer, the amount of NO that is generated at the excess-air zone of the pyrolyzer (at the distributor) is minimized. Third, because the pyrolyzer is able to operate at very low air levels, there are high concentrations of reducing fuels, such as carbon and carbon monoxide, in the pyrolyzer and its freeboard, which further reduces the NO.

Finally, by being able to burn mainly volatiles in the combustion bed, and by evenly distributing the fuel with the sparge pipes in the combustor, lower levels of air can be used at the combustion bed without incurring combustion inefficiencies. The use of lower excess-air levels in the combustion bed creates a carbon-rich and carbon monoxide-rich atmosphere there and in its freeboard, which further reduces the $NO_x$ emissions.

The present invention also reduces the emission of carbon monoxide. Carbon monoxide is formed in fluidized bed combustors primarily at the fuel-rich spouts over fuel feed points. Carbon monoxide emissions are reduced by the use of the subject invention because the relatively coarse fuel spouts by conventional fluidized bed combustors are replaced by the much more numerous, and thus smaller, fuel-rich spouts over each orifice of the sparge pipes. As a result, the mixing of the fuel-rich spouts with surrounding air, which is how the carbon monoxide emissions are reduced, is achieved more quickly and completely than in the conventional systems. Moreover, this is achieved with a universal sparge pipe configuration.

More specifically, the advantages with respect to environmental considerations over and above those that were available with the aforementioned dual-bed systems and the limestone grate are as follows: Sulfur dioxide, in effect, is unaffected. Nitrogen oxide emissions are reduced primarily because the pyrolyzer represents a third stage of treatment. What happens in the pyrolyzer is that the major source of nitrogen oxide emissions in a fluid bed combustor is the nitrogen contained in the fuel. The pyrolyzer is run at temperatures as high as 1,600° F., for example, which is a preferred temperature range for minimizing the nitrogen oxide emission. These fuel nitrogen compounds are broken down into intermediate compounds such as cyanide and ammonia; and it has been observed that if that is done as a first step, and then air is added as a second step at the combustion bed, the levels of nitrogen oxide that are emitted are far less than if that additional step is not taken. With the use of the pyrolyzer, emission levels of nitrogen oxide below 100 PPM and below even 50 PPM have been experienced, whereas, typically 300 PMM or more is experienced in a single stage and also similar levels in a dual-bed. So the addition of a pyrolyzer is, in fact, a proven method of getting very significantly reduced nitrogen oxide levels. The way in which those are achieved is to run the pyrolyzer at a high enough temperature to break down the fuel nitrogen compounds, and the combustion bed is run at excess air levels that are relatively low. Typically the excess air level might be 5% or even 0. Thus, in the freeboard region where secondardy air is added, enough additional air is provided to then complete the combustion of unburned hydrocarbons and carbon monoxide.

Finally, there can also be tertiary air added generally at the distributor plate of desulfurizing bed, which would cause sulfides in the bed to be operated at yet lower temperatures. Basically, the excess air level is between 0 and +5% in the combustion bed. The combustion bed temperature is typically 1,500°-1,700° F. The excess air level at the secondary air pipes is on the order of 20-25%, and the temperature at that point needs to be about 1,450° F. in order to burn out the carbon monoxide. Also, there has to be a residence time of at least a half a second of the gases between where the secondary air pipes are and the end bed. That combination then gives you very low levels of nitrogen oxide.

Carbon monoxide is generated in a fluid bed combustor primarily from locally fuel-rich regions around fuel feed pipes, whether they are under-the-bed feed pipes or wherever the fuel is being fed. The close-coupled pyrolyzer system is much better at injecting these fuel in a more uniform way because of the universal fuel sparge pipes. One avoids these severely fuel-rich regions and in fact replaces them by injecting the fuel every few inches instead of every few feet. That extra uniformity produces a much lower carbon monoxide emission level.

The dioxins that are related to the garbage burning, the conditions for 99.9% removal of those is that there should be a temperature of at least 1,800° F. for at least one second. Those conditions are also met in the fluidized bed combustor. Basically, the ability to deal with the dioxin issue is to be able to operate at 1,800° F.

Hydrogen chloride is an emittent that gives a visible plume. It is also very corrosive to steam tubes. One feature of the subject system is that because of the combustion from the scrubbing action, one is able to use the limestone which has previously been used for sulfur oxide to also scrub out hydrogen chloride. Both of them are acids and both of them react to the base. The upper bed, which works best with sulfur dioxide at 1,550° F., works best with hydrogen chloride at lower temperatures, and if one uses dolomite, which is a form of limestone that also has magnesium carbonate in it, dolomite is able to efficiently desulfurize at lower temperatures. When dolomite is used and some additional cooling air at the distributor is used such that a temperature of about 1,300° F. is achieved, one can in fact scrub both hydrogen chloride and sulfur dioxide, but a dual-bed system is required for this purpose.

Combustion Efficiency

Combustion efficiency is improved for the same reason as that described above with regard to carbon monoxide emissions; namely, the fuel is injected much more uniformly than with the existing systems. Use of the universal sparge pipes to inject the fuel into the combustion bed greatly reduces both the size and the fuel-rich concentration of the spouts that occur above the fuel injection points. Thus, the ability to mix the required amount of air needed to complete combustion into the fuel spouts is much easier with the present invention, resulting in higher combustion efficiency.

INTEGRAL SHALLOW-BED PYROLYZER

The feed system to the pyrolyzer can be a single-point system, such as a chute or a spreader, as follows. When only coarse fuels are to be consumed, including fine fuels that agglomerate (such as sludges, slurries and tars), and whether the fuels are of high or low density, a shallow-bed pyrolyzer with over-the-bed feed is preferred. The fuel particles remain in or on the bed until heated and pyrolyzed, and the bed motion is used to spread the fuels across the bed. As has been described, this pyrolyzer can be made intergal to the combustor. Thus, coarse fuels are, in part, converted to volatiles which are easily injected into the combustion bed through the use of an integral and relatively inexpensive shallow-bed pyrolyzer.

A fuel spout is expected to occur near the pyrolyzer fuel feed point, but its composition is essentially the same as that of the volatiles emitted elsewhere in the pyrolyzer insofar as there is only a negligible amount of chemical reaction (oxidation) occuring, so that the only non-uniformity is with regard to the flow rate. But this has no effect on the performance of the combustion bed insofar as the flows to the bed are evened out by the use of restrictive orifices in the sparge pipes.

DEEP-END PYROLYZER

Figure 3:
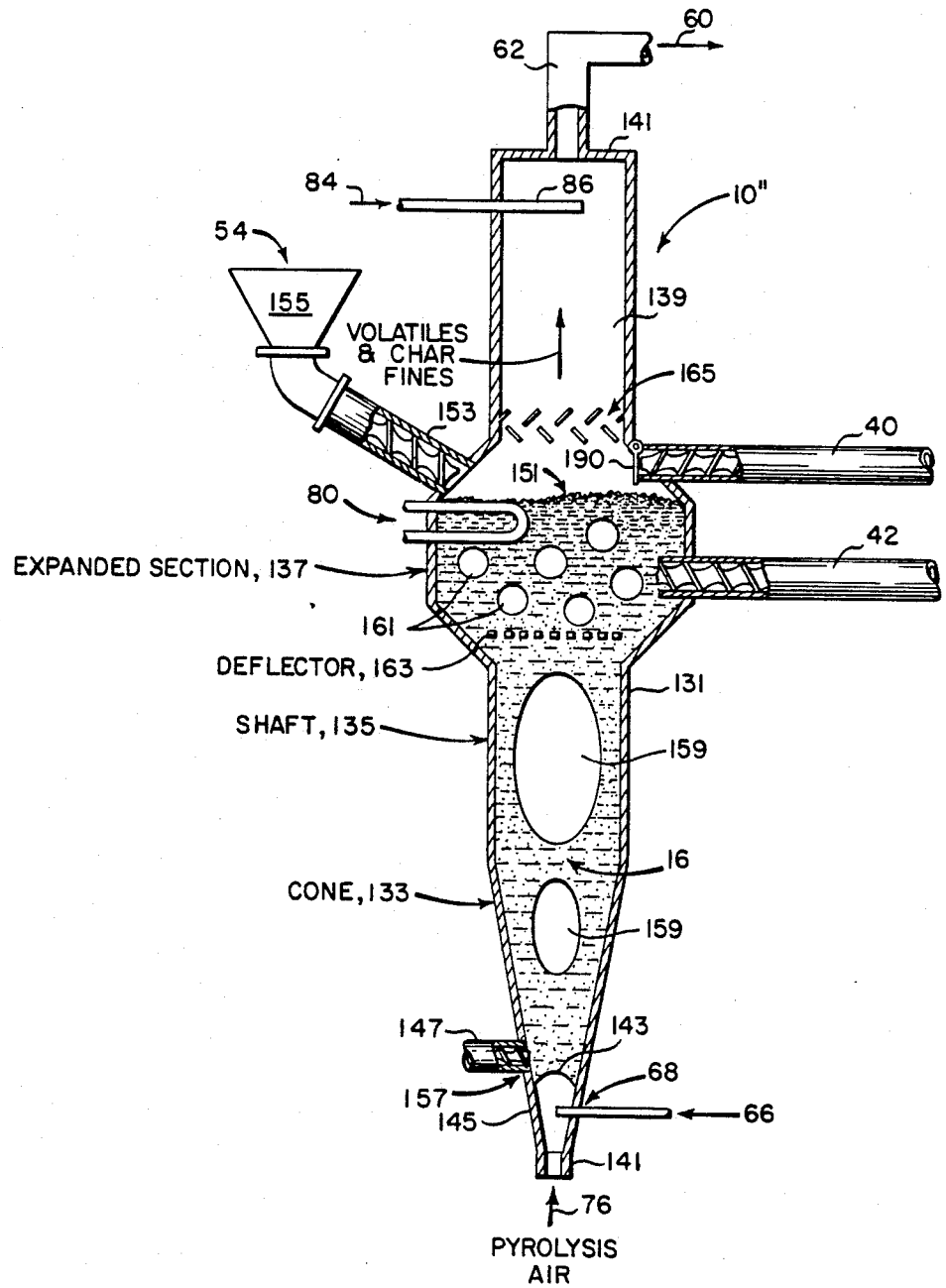
FIG. 3 is a sectional view of a specialized deep-bed pyrolyzer for handling virtually any fuel.

An alternative to shallow-bed pyrolyzer 10' is the deep-bed pyrolyzer 10" depicted in FIG. 3. The main purpose of the deep-bed pyrolyzer is to extend the range of fuels that may be handled. The deep-bed pyrolyzer of FIG. 3 performs the same functions as the deep-bed pyrolyzer shown in FIG. 1 but shows more details of construction.

The deep-bed pyrolyzer is capable of processing all types of fuels, including the types handled by the shallow-bed pyrolyzer, but also the fuel fines, gases and liquids that are either unusable in a shallow bed or require customized injectors, such as spray bars. It is somewhat more costly to construct and operate than the shallow-bed pyrolyzer and is not used unless required.

Deep-bed pyrolyzer 10" includes a casing 131 consisting of a cone 133, cylindrical shaft section 135, expanded bed zone section 137, freeboard section 139 and pyrolyzer top 141 which together form a gas-tight vessel. Connected to the bottom of cone 133 is inlet pipe 141 that conveys pyrolysis air 76 into the bottom of the pyrolyzer. Within the pyrolyzer is fluidized bed 16 whose bottom 143 is formed by the high velocity of the pyrolysis air 76 as it enters the narrow portion 145 of cone 133, and whose top surface 151 is in expanded section 137.

Fuel fines are injected into bed 16 above bed bottom 143 by a conveyor 147, such as a screw conveyor. Liquid fuels 66 are sprayed at surface 143 by injector 68. Gaseous fuels are injected through another outlet of injector 68 whose larger diameter accommodates the lower density of the gas. The fuels injected at injectors 147 and 68 are those requiring an extended residence time within the bed and which would blow out of the bed before being adequately heated and pyrolyzed if they were injected at top surface 151 of bed 16.

The types of fuels 54 which are suitable for over-the-bed injection into a shallow-bed pyrolyzer are injected into deep-bed pyrolyzer 10" by over-the-bed injector 153. Use of over-the-bed fuel injection reduces the pressure differential across the pressure-sealing device, such as a lockhopper (not shown), that is located upstream of the hopper 155 and which is required to bring the fuel up to the pyrolyzer pressure. Since lockhoppers are difficult to make leakproof, particularly when dealing with a wide variety of fuel consistencies (as are similar devices, such as rotary valves), the lower pressures associated with feedpoint 153 compared with feedpoint 157 reduce the potential for maintenance problems associated with the feed system.

It may nevertheless be more desirable to inject volatile fuels such as plastics, at under-the-bed feeder 147, as the amount of pyrolysis air that would otherwise be needed to maintain adequate fluidization in the lower portions of bed 16 may be excessive.

Combustion bed solids are conveyed to pyrolyzer 10" by screw conveyor 40. Pyrolyzer bed solids are removed from the pyrolyzer by conveyor 42. The point of attachment of conveyor 42 is somewhere near the bottom of the expanded bed zone and below the bed surface 151. Locating the point of attachment to conveyor 42 below surface 151 increases the available volume, and thus residence time, of the floating fuels such as plastics, paper and RDF, thereby increasing the percentage of completion of pyrolysis of such fuels.

Cone 133 has a narrow included angle, typically of 15°, to allow the fuel injected near the bottom to spread evenly across the diameter of the pyrolyzer from only a single feed point. Cylindrical shaft section 135 is included to increase the residence time of the fuel within the bed and the completeness of pyrolysis.

The bubbles 159 formed in sections 133 and 135 typically grow to approximately two-thirds the diameter of the vessel up to a diameter of about 3 feet. The bed solids and entrained fuel are moved upwards as slugs by these bubbles, while solids near the walls return to the bottom of the cone.

Without the expanded section 137 of pyrolyzer 10", it would be impossible to form a surface 151 within the pyrolyzer, as the bubbles would carry the slugs of material out of the pyrolyzer through outlet 62. Without the presence of surface 151, the pyrolyzer would not be able to functions as a classifier. Use of the expanded section allows the large bubbles emerging from cylindrical shaft section 135 to expand laterally, causing them to break up into smaller bubbles 161, as with the motion at the top of a submerged spouted bed. Perforated deflector 163 may also be used to help break up the large bubbles and reduce the violence of motion at bed surface 151.

Freeboard 139 above the bed is made tall enough to prevent the carryover of bed material, including coarse char, at outlet pipe 62. Separator 165 further reduces the carryover of bed material and the height requirement of the freeboard. Separator 165 may consist of baffles as shown, an in-line centrifugal separator or similar device.

The start-up, operation and shutdown procedures for pyrolyzer 10" are the same as those previously described for pyrolyzer 10'. The function of elements 80 are also the same as those previously described.

MUNICIPAL SOLID WASTES

One adaptation of the subject invention is for the incineration of MSW (municipal solid wastes). Incineration is the environmentally preferred method of disposing of MSW because it reduces landfill requirements by a factor of 30 while eliminating the leaching problems associated with landfilling MSW that can contaminate water supplies. The commonly used incinerator used for this purpose, called a mass burner, burns untreated MSW in a furnace similar to a stoker. The hot gases emerging from the furnace are passed through a boiler to reduce their temperature enough for their treatment in pollution control systems, such as dust-removal filters. The steam generated at the boiler may be used to produce electricity or be used for other heating purposes, which reduces the net cost of incinerating the MSW.

A key problem associated with mass burners is the air pollution which affects the acceptability of the systems. Other problems are equipment size and co-firing capability, both of which affect the economics.

MSW incinerators are faced with a large number of potential pollutants. These may be grouped into the legislated pollutants (sulfur dioxide, oxides of nitrogen and particulates) to which have sometimes been added carbon monoxide and hydrogen chloride. A second group includes the hazardous wastes, principally the chlorinated hydrocarbons, such as the dioxins. A third group deals wth heavy metals, such as mercury, lead and cadmium. Both of the latter groups are found in trace concentrations but can be highly toxic.

The levels of emissions that are acceptable depend on the size of the plant and the ambient levels of the air pollutants at the proposed site. In general, the levels of emitted pollutants are high enough to require siting the incinerator away from the most populated areas, at additional transportation cost of the relatively bulky MSW. Scrubbers are available to remove hydrogen chloride and are coming into increasing use; they also add appreciably to the cost. Particulates are also commonly removed, but none of the other pollutants are commonly scrubbed.

The chlorinated hydrocarbons are destroyed if the gases in the furnace achieve a temperature of at least 1,800° F. in an excess-air atmosphere for over one second. The difficulty of achieving this condition in mass burners relates to the lack of control and resulting non-uniformity of the "fuel" which may include incombustibles that cool the flame below the required temperature, at least locally.

The heavy metals generally occur in small concentrations in MSW, and some are captured in the dust collector, but the ones with low vapor points escape essentially uncaptured.

With regard to economic issues, the furnaces of mass burners are typically 20 times as large as those of an equivalent capacity coal-fired unit due to the relatively slow burning characteristics of large, untreated objects that can be included in the waste. In effect, the furnace has to be sized for the slowest burning of such objects.

Related to this is the need for furnace redundancy to permit the solid waste to continue to be processed when part of the system is down for repairs. Repairs of the furnace are required to deal with the effects of the molten glass in the MSW, which melts and corrodes the furnace walls and also causes slag build-ups and, with the combustion grate, which gets clogged by molten slag. Other high maintenance areas may include the superheater section of the boiler which can be corroded by the hydrogen chloride formed by the combustion of plastics, and the boiler tubes which are eroded by metal and other dirt in the flue gases.

The amount of MSW generated by the community varies significantly with the time of the year, and the plant has to be sized for the peak load. In addition, spare capacity is generally built in to accommodate future increases in load. It would be economically attractive to burn alternative fuels, primarily coal, to maintain the system at full capacity at all times, thereby increasing the revenue stream by a third or more, but mass burners are technically incapable of doing this because this grates slag up when a hotter fuel such as coal is co-fired with MSW.

The net result is that mass burners facilities must charge a fee for disposing of the MSW that is typically several times higher than that of landfilling, while also creating a concern to the community with regard to air pollutants.

Other limitations of mass burners include a predilection to explosions when combustibles or explosive tanks are included with the waste. Resource recovery of such materials as aluminum, steel and glass, which is valued as a conservation measure and could add to the revenue stream, is also generally uneconomical with mass burners and therefore not attempted.

The present invention addresses all of these issues, resulting in a system that is both environmentally acceptable and cost effective. In particular, it appears to be able to meet the most stringent of the air pollution emission requirements with regard to all three types of pollutants which generating electricity at a price competitive with that generated at conventional power stations and at fees no longer than those normally associated with landfilling.

The preferred embodiment of the subject invention requires that the MSW be pretreated to reduce the particle size and remove many of the contaminants. The material obtained by the pretreatment is known as refuse-derived fuel (RDF). A number of RDF processes exist, and the subject invention may be made to work with most of them, but optimal results are obtained with the system of FIG. 6.

Figure 6:
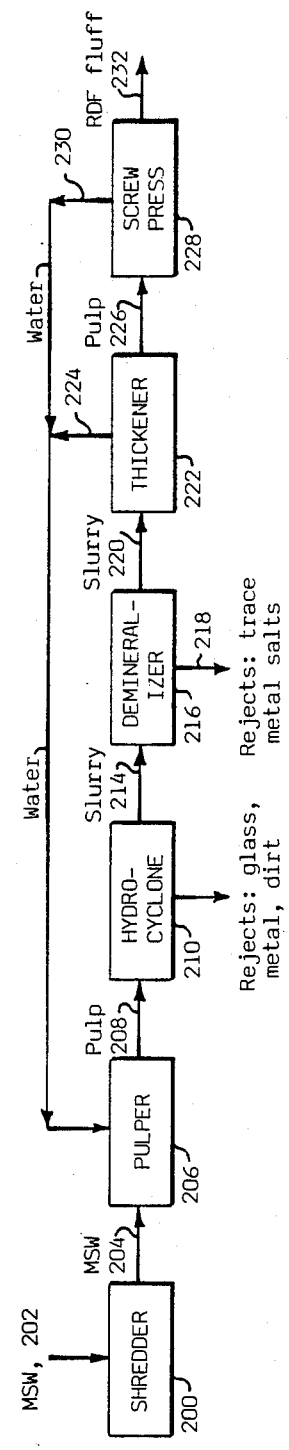
FIG. 6 is a schematic view of a refuse-derived fuels preparation plant to be used for providing fuel to combustors.

Referring to FIG. 6, raw MSW 202 is supplied to the RDF plant at shredder 200 that reduces the material to a maximum diameter of two inches, forming material 204. Shredder 200 is a slow-speed hydraulic design that avoids the generation of sparks that could otherwise cause explosions there. Material 204 is mixed with water in pulper 206, where it is shredded to a maximum diameter of one quarter of an inch to form pulp 208. Pulper 206 is similar to the equipment used to make pulp in the paper-making industry.

Pulp 208 is then pumped through hydrocyclones 210. The high-density particles 212 from the hydrocyclones are removed at the bottom, specifically metals, glass and dirt. The combustibles, which have a specific gravity of about one, pass through. By using water as the medium, the separation of incombustibles is far more complete than in dry systems, where air is used as the classifying medium and where a large, low-density object, such as a piece of wood, is indistinguishable from a small but high-density material, such as a metal bolt.

The efficiency of separation is important to the overall process because the amount of low-melting contaminants, such as glass and aluminum, that is contained in dry-processed RDF, limits the temperature of the fluidized bed combustor to an operating temperature of 1,600° F., tow low to effectively consume the dioxins. Higher bed temperatures with such RDF causes the bed to slag up.

However, with the wet-processed RDF of the FIG. 6, the ash fusion point of the RDF is well above 2,000° F., high enough to avoid slagging at 1,800° F., the temperature required to destroy dioxin. Rejects 212 are also clean enough to provide salable products, such as aluminum and glass, by a relatively simple screening process.

Referring again to FIG. 6, slurry 214 emerging from hydrocyclones 210 is pumped through demineralizer 216 to remove the trace metals if the amount of trace metals 218 in the MSW justifies its use. The wet RDF process provides the only technically feasible method of removing such metals, particularly lwo-vapor pressure metals such as mercury. Demineralizer 216 uses the same technology that is employed to remove trace elements from boiler feedwater.

Slurry 220 is pumped to a thickener screen 222 where the free water 224 is drained off. The resulting pulp 226 is then conveyed to screw press 228 where the remaining free water 230 is squeezed out. Emerging at the outlet of press 228 is material 232 containing about 55% moisture that is called RDF fluff.

In one embodiment, the RDF fluff is then conveyed to lockhopper 144 of FIG. 2 and is consumed. Combustion bed 26 is operated at 1,800°–1,850° F. to sufficiently consume the dioxins. The height of the freeboard between secondary air injectors 110 and desulfurizing bed 30 is sufficient to provide a residence time of at least 0.5 second in order to complete the combustion of carbon monoxide. The total freeboard height between the top of coolant tubes 100 and the bottom of desulfurizing distributor 28 is sufficient to provide at least 1.5 seconds of residence time. The physical heights of freeboard 108 corresponding to these residence times are 3.5 and 10 feet, respectively.

With RDF, a significant amount of hydrogen chloride is contained in the flue gases which creates a visible plume as well as an objectionable odor at the stack and is corrosive both inside and outside the boiler. It therefore becomes desirable to scrub the hydrogen chloride within the fluidized bed combustor. This can be accomplished by the use of the calcium oxide in the fluidized bed 30, which can be used to simultaneously scrub sulfur dioxide and hydrogen chloride, as long as the temperature is below 1,300° F., insofar as hydrogen chloride does not react very well at higher temperatures. Dolomite is required as the source of calcium oxide as limestone will not calcine at temperatures as low as 1,300° F., and therefore, is not reactive at the temperature required to scrub the hydrogen chloride.

Upper bed 30 is cooled to this temperature by the addition of tertiary air (not shown) at distributor 28 or by the engagement of steam tubes 101 which are located in the splash zone of bed 30. Heat is removed from bed 30 by tubes 101, which are brought into contact with the bed by raising the level of bed 30 above its customary depth through the blockage of overflow 34.

One disadvantage of a wet RDF preparation plant is the high levels of moisture of the fluff which, for the 55% wet fuel, reduces the efficiency and output of the plant by 25%, while increasing the boiler size by a similar amount due to the added volume of the fuel-contained water vapor in the flue gases. While air-drying the RDF is possible, this remains an unattractive option because of the large storage space involved and the possibility of generating odors. Drying the RDF in a drier reduces the boiler size but does not improve the plant's efficiency, output, and may also create air pollution problems.

DRIER HEATED BY COMBUSTION BED SOLIDS

Figure 7:
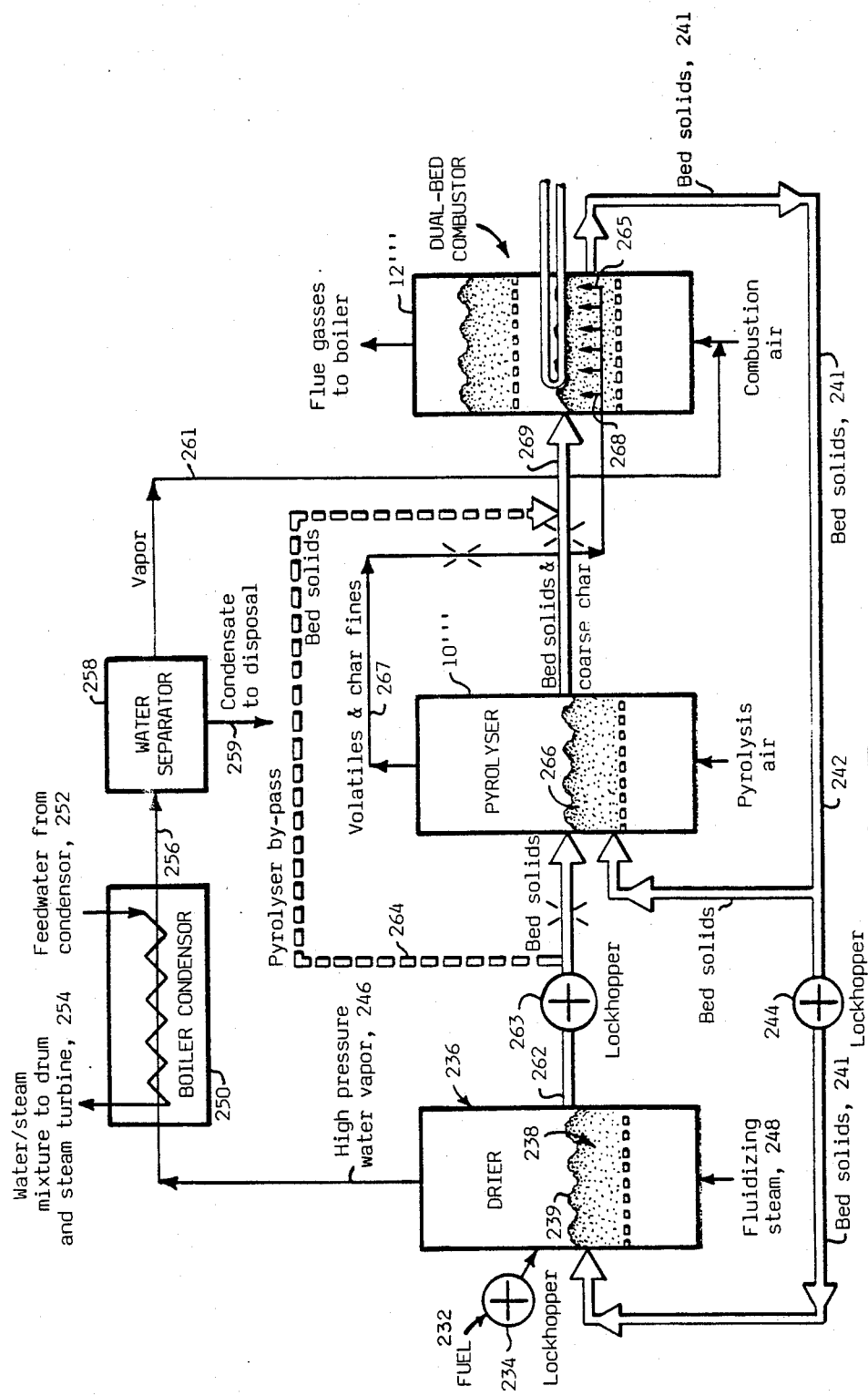
FIG. 7 is a diagrammatic view of one embodiment of the subject invention for the combustion of refuse-derived fuels.

Both the efficiency and boiler size problems are solved by use of the drier system of FIG. 7, which dries the RDF at a sufficiently high pressure and temperature to create an economically useful form of water vapor.

In FIG. 7, RDF 232 is introduced into pressurized drier 236 through lockhopper 234. Drier 236 is a cylindrical vessel with a drumhead top and bottom to withstand high internal pressures. Within the drier is fluidized bed 238 which fed hot combustion bed solids 241 by conveyor 242 through lockhopper 244 and onto the bed with a conventional over-the-bed feed chute (not shown). The RDF floats on the surface 239 of bed 238 where it is mixed with hot beds solids and then dried. Emerging from the drier is a mixture 246 of water vapor and a small amount of volatile matter that has been driven off the RDF.

The flow rate of the combustion bed solids is controlled to provide a bed temperature of several hundred degrees Fahrenheit in order to have mixture 246 leave the bed and be at a useful temperature for driving a turbine or providing steam for heating. Typical temperatures of water vapor 246 range from 500° F. if the steam is to be used to drive a steam turbine, to 300° F. if the steam is to be used for process steam, to 212° F. if the steam is to be used for space heating. In the latter case, drier 236 is unpressurized, and the need for the lockhoppers is reduced or eliminated.

Even with no steam requirement, it is advantageous to use an unpressurized drier with high-moisture fuels insofar as the size of the boiler and its downstream equipment are significantly reduced because the volume of water vapor associated with the wet fuel is no longer passed through the boiler. But the improvement in efficiency that would be achieved if heat recovery were employed is lost.

Drier bed 238 is fluidized by steam 248 instead of air. This avoids the horsepower requirements that would be associated with supplying high-pressure air to the drier, instead replacing it with the relatively insignificant horsepower requirements associated with the pressurizing of water in a feedwater pump.

The bed depth of drier 238 is made greater enough to give the incoming fuel sufficient residence time to be dried, a matter of some minutes. A drier depth of two to four feet is normally required for this.

Mixture 246 that emerges from the drier is piped to counterflow heat exchanger 250 where the water vapor 246 is condensed and then cooled by circulating water 252 in an economiser. Conversely, circulating water 252 is heated and then boiled, leaving boiler/condenser 250 as saturated mixture 254 consisting of water and steam. The function of boiler/condenser 250 is to allow the heat from the relatively dirty mixture emerging from the drier to be used in systems requiring high-purity steam, such as steam turbines.

The non-condensables in a stream 256, consisting of the small amount of fuel that has been pyrolyzed at the drier temperature, are separated from condensate at water separator 258. The condensate 259 is treated (if necessary) and disposed of; the non-condensables 261 are disposed of by injecting them into the combustion air stream of the fluidized bed combustor 12'''.

Solids 262 removed from drier 236 contain the dried solids as well as combustion bed solids 241 that have mixed into the bed. Solids 262 are removed through lockhopper 263 and conveyed to pyrolyzer 10'''. Pyrolyzer 10''' is the same as pyrolyzer 10' of FIG. 2. The use of circulating combustion bed solids is necessary to achieve the efficiency and plant output gains of the invention. With conventional driers that use flue gases or auxiliary fuels as the source of heat, the blower horsepower required to bring the flue gases to the several hundred psi of the drier eliminates the advantage of the drying process. But combustion bed solids being incompressible suffer no such power loss as they are brought to pressure in a lockhopper.

The second step, of returning the bed solids containing the fuel back to a combustor, is also required; otherwise, there would be no way to reuse the heat transfer medium (the sand). The concept of using combustion bed solids as a source of heat in a drier and returning them to a combustor may also be used with other systems, such as circulating-bed fluid bed combustors, rotary combustors, etc. It may also be used with a dual-bed combustor, but without the pyrolyzer, if wet fuels such as colliery tailings, are used; in this case, pyrolyzer 10''' is eliminated, and drier solids 238 are conveyed to combustor 12''' by conveyor 264, which elimination is indicated by the dotted x's.

USE OF THE PYROLYZER TO SUPERHEAT THE FLUE GASES

Using the pyrolyzer as a fuel processor and to reduce emissions has been described. The pyrolyzer may also be used to generate higher temperature gases than can be produced by the fluidized bed combustor. Any of three functions may be achieved by use of the pyrolyzer, and any combination of them, including all three simultaneously. Factors that may limit the outlet temperature of the fluidized bed combustor include temperature at which a pollutant, such as sulfur dioxide, is scrubbed, the fuel's ash fusion point or the material limits within the combustor.

Figure 8:
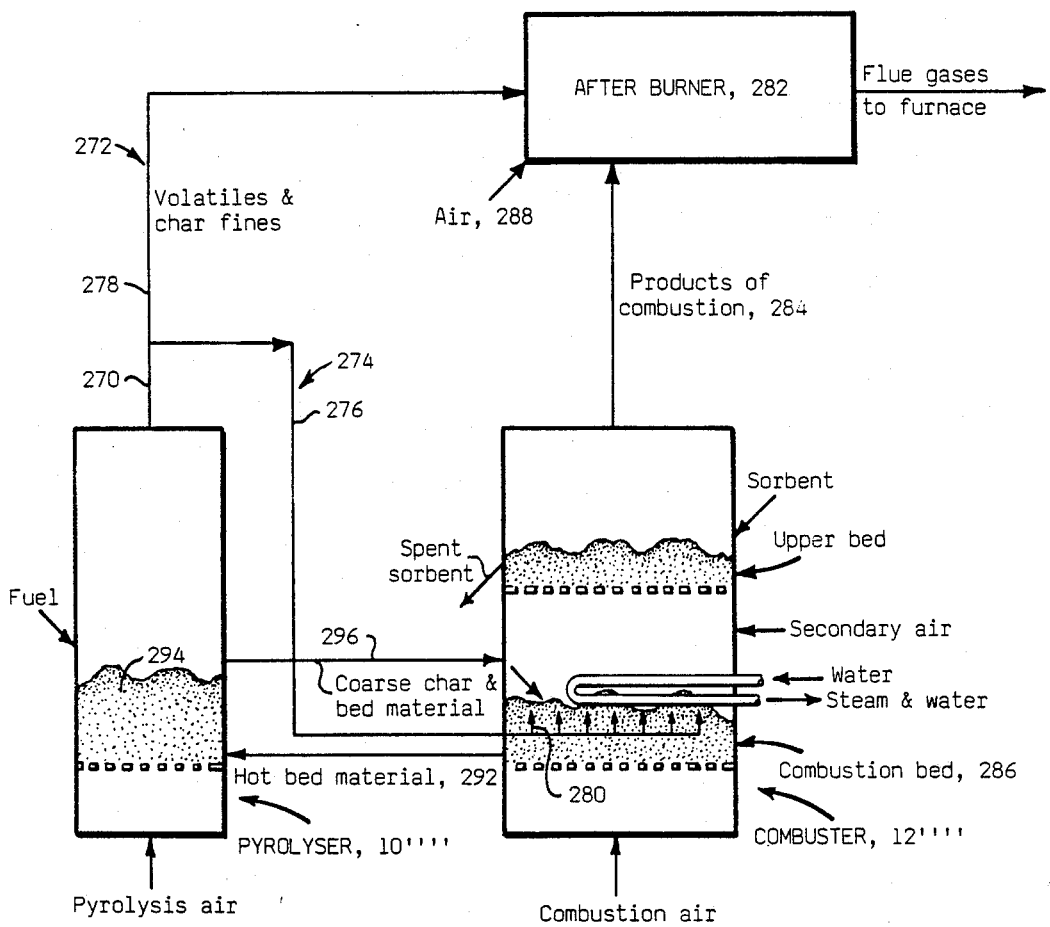
FIG. 8 is a schematic view of a high-temperature embodiment of the subject invention utilizing an afterburner.

FIG. 8 illustrates how the pyrolyzer is used to generate the high temperature gases. In FIG. 8, pyrolyzer 10'''' and combustor 12'''' are the same as previously described. But volatiles stream 270 is divided into two streams 272 and 274 using control valves (not shown) in ducts 276 and 278. The volatiles in duct 276 flow the fuel sparge pipes 280 in combustor 12''''. The volatiles ducted to an afterburner 282 are used to heat the products of combustion (flue gases), leaving combustor 12'''' at 284, to higher temperatures than are otherwise attainable. In principal, volatiles 272 are combusted with air 288 to provide a stoichiometric flame which is mixed in with products of combustion 284 to heat it. In actuality, all three streams 270, 274 and 284 are mixed together at the afterburner, but the resulting temperature is the same.

Depending on the ash fusion point of the fuel and the operating temperature of afterburner 282, separates may be required to filter out the particulates from streams 270 and 284 to avoid slagging in the afterburner. The separated particulates are injected into stream 276 for further combustion. Note that hot combustor bed materials 292 heat bed 294 of the pyrolyzer. Coarse char 296 is delivered to bed 286, as described above.

AFTERBURNER USE IN HIGH-TEMPERATURE COMBINED-CYCLE SYSTEMS

Figure 9:
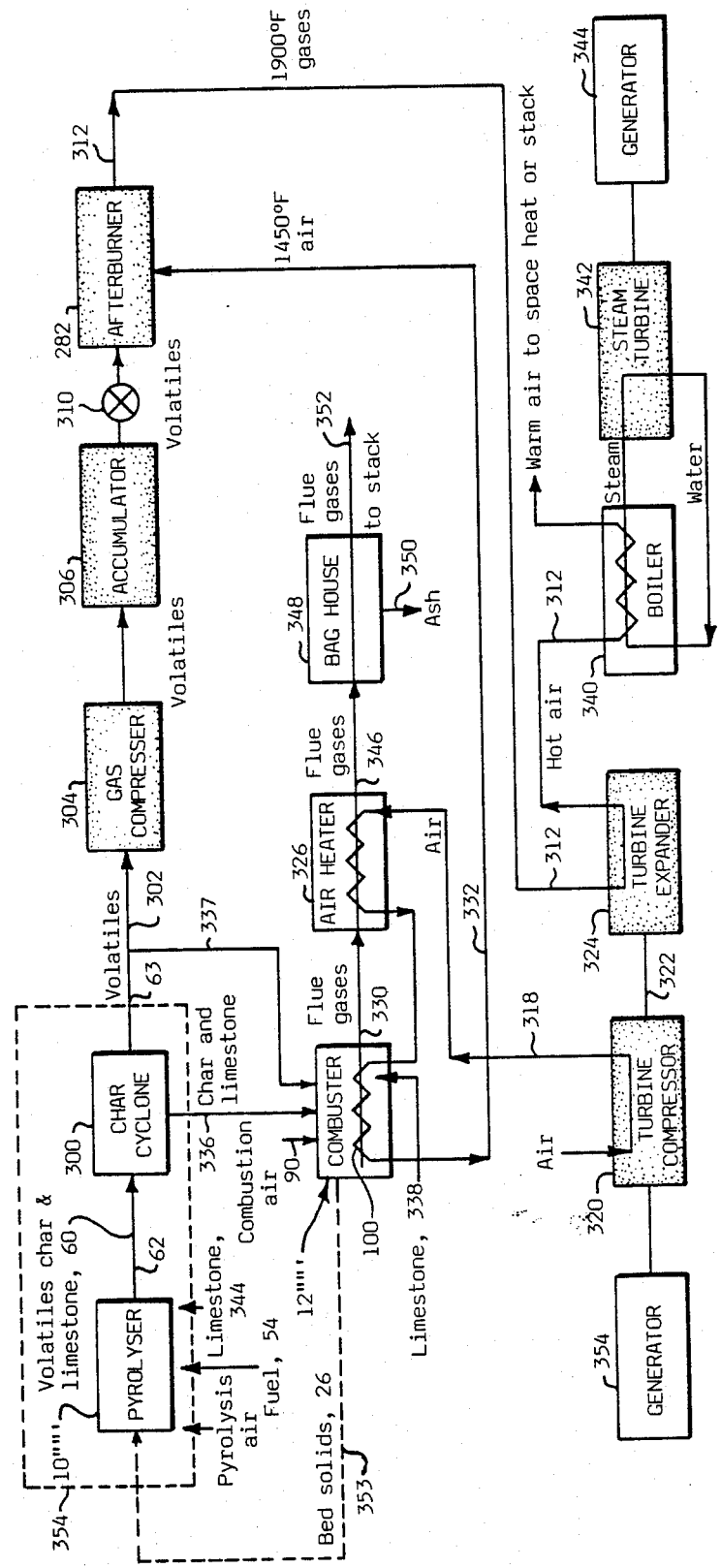
FIG. 9 is a schematic view of an alternative high temperature embodiment utilizing a pyrolyzer, cyclone, and afterburner to produce a high temperature stream for use with combined-cycle cogeneration.

FIG. 9 depicts the use of the invention with the afterburner 282 to generate electricity in a combined-cycle (gas turbine-steam turbine) system. Combined-cycle systems are significantly more efficient than conventional electric power plants but only if they can use the high-temperature capability of the gas turbine, typically 1,900° F.

The direct injection of solid fuels into the gas turbines of combined-cycle plants is limited by the difficulty of adequately cleaning the flue gases to prevent the fouling and corrosion of the turbine blades by the ash in the fuel. Thus, indirect systems are used with solid fuels, whereby the clean, heated air is the medium that passes through the turbine, which air has been heated at in-bed tubes in the combustor. But such systems are limited to 1,450° F. air temperature by the effects of high temperature on tube strength.

Use of the volatiles generated at the pyrolyzer can be used to create the additional temperature in the air going to the turbine by their direct injection into the pressurized air. Unlike direct combustors which convert all of the fuel into a gas and thereby generate very fine particles of ash which are then difficult to capture, pyrolyzers leave the fuel particles porous but otherwise intact and therefore coarse enough to be efficiently captured in cyclones, which avoids the erosion problem associated with direct combustion. Corrosion is avoided by operating the pyrolyzer at low enough temperatures to avoid the emission of alkalais from the ash. Therefore, only clean, non-erosive and relatively non-corrosive coal gases are generated by te use of the pyrolyzer, and coal can be used by this method to generate the maximum temperatures and cycle efficiencies of a combined cycle.

FIG. 9 shows the volatiles 60 leaving a pyrolyzer via conduit 62 and entering a cyclone 300 where the char particles and other solids are separated from the volatiles. The cycle is of conventional design, though built for high-temperature use. The pyrolyzer is similar to the design shown in FIG. 1, excluding, however, outlet conveyor 43, water tubes 80 and coolant pipe 86. Since the pyrolyzer has no method of providing a bed surface, it fills up with bed material, and all material leaves overhead at pipe 62. Note that hot bed solids 26 are delivered to the pyrolyzer in line 353, such that pyrolyzer and cyclone act together to produce two fuel streams, as illustrated by dotted box 354.

Approximately 40% of the volatiles in line 63 are sent through line 302 and are then compressed by compressor 304, temporarily stored for control purposes in accumulator tank 306, metered by control valve 310 and burned in afterburner 282 to provide an outlet temperature of 1,900° F. in stream 312. The afterburner may be external to the gas turbine or incorporated in it. The actual amount of volatile matter sent through line 302 is controlled by the temperature of stream 312.

The remaining approximately 60% of the volatiles are piped in from duct 63 via line 337 to the fuel sparge pipes 64 of fluidized bed combustor 12'''' where they are burned. The char is conveyed by conveyor 336 to the combustion bed 26 and burned. If the char contains a significant fraction of fines, a char classifier (not shown) is placed in duct 336. Coarse char separated at this char classifier is then conveyed to the bed at the over-the-bed injector 44, which char fines separated by this char classifier are injected into line 337 where they are entrained by the volatiles 60 and piped with them to the fuel sparge pipes 64. Uses of the char classifier avoids the combustion inefficiencies that would occur if the char fines were introduced to the combustion bed 26 by the over-the-bed injector.

Combustor 12'''' of FIG. 9, is the same as that of the preferred embodiment shown in FIG. 2 except that compressed air 318 flows through coolant tubes 100 instead of water and steam. This air is provided by air compressor 320 that is driven through shaft 322 by turbine expander 324. Together these elements comprise the rotating components of the gas turbine. Compressed air 318 leaving gas compressor 320 first enters air heater 326 which cools (by counterflow heat exchange) the flue gases 330 leaving fluidized bed combustor 12''''. The compressed air then passes through in-bed tubes 100 before being ducted at 1,450° F. in line 332 to afterburner 282.

Not shown in FIG. 9 is a gas-to-gas heat exchanger that uses the remaining heat in flue gases 346 to preheat combustion air 90 or otherwise captures and employs the heat in flue gases 330.

If the gases emerging from pyrolyzer 10 in FIG. 9 are to be scrubbed of, for example, sulfur compounds, sorbent 334, such as limestone, is fed with fuel 54 into pyrolyzer 10''''. This removes whatever sulfur is gasified in the pyrolyzer, principally as hydrogen sulfide, to form particles of calcium sulfide which are then separated from the volatiles by char cyclone 300 and conveyed with char in line 336 to combustion bed 26 of FIG. 2. There the calcium sulfide is oxidized in an excess-air atmosphere into calcium oxide, from which it is returned by a conveyor (not shown) to the pyrolyzer 10''''. Conversion of the calcium sulfide to calcium oxide in combustion bed 26 releases sulfur dioxide into the combustion bed freeboard, which is then captured in desulfurizing bed 30, along with the sulfur dioxide formed by the combustion of the char, by the addition there of limestone 338 in FIG. 9. If hydrogen chloride is also to be scrubbed, dolomite must be substituted for limestone 334 and 338.

The remaining components 340–354 of FIG. 9 are the same as those found in a conventional combined-cycle system. As in conventional systems, flue gases 346 are supplied to a baghouse 348 where ash 350 is removed, with the remaining gases 352 supplied to the stack. One variation of FIG. 9 provides a pressurized pyrolyzer and char cyclone which eliminates the need for gas compressor 304 but requires the use of lockhoppers to transfer solids into and from the pyrolyzer and char cyclone.

HIGH-TEMPERATURE EMBODIMENT FOR THE COMBUSTION OF HAZARDOUS WASTES

Figure 10:
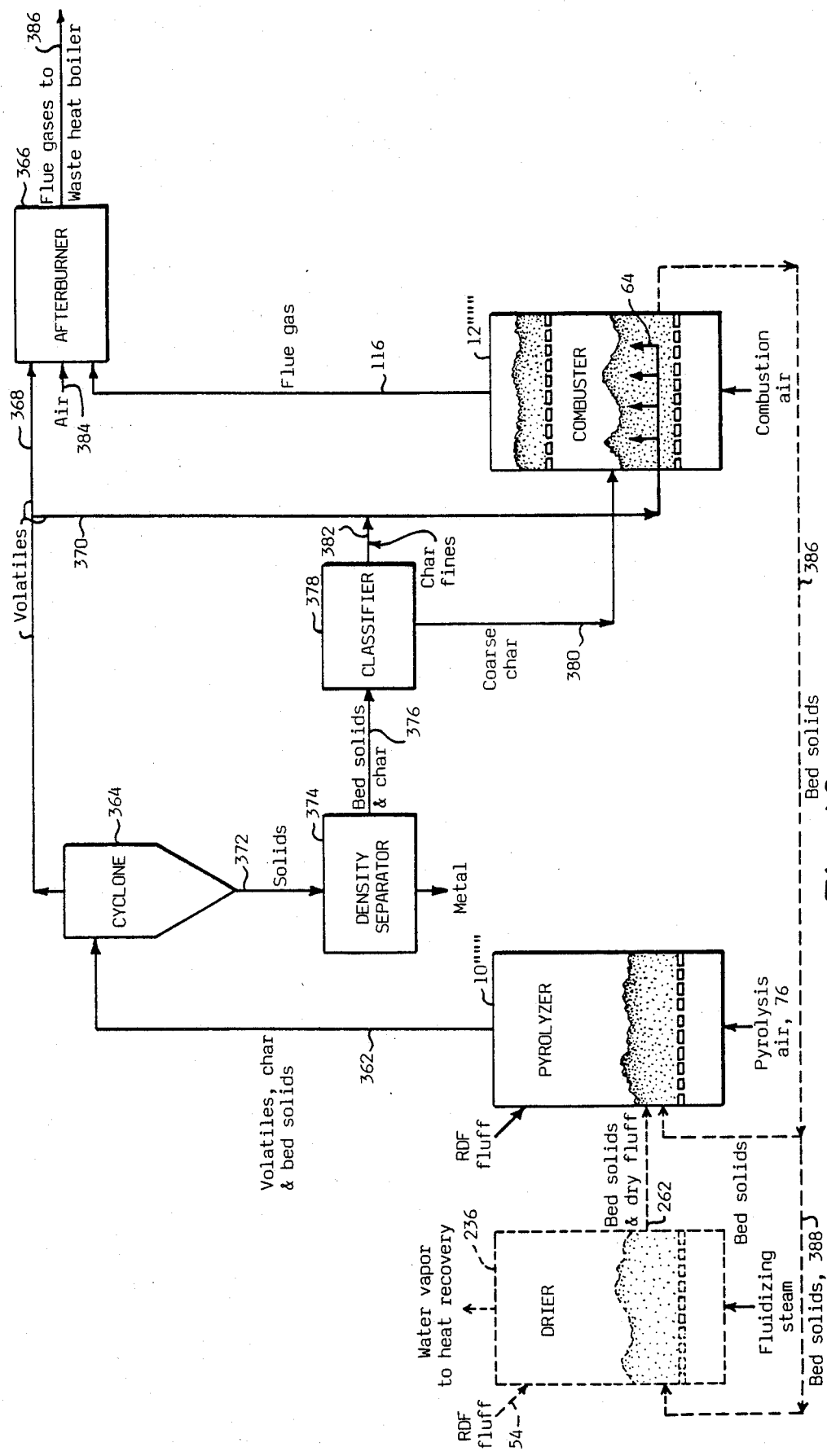
FIG. 10 is a schematic view of a high temperature embodiment of the subject invention for use in the combustion of hazardous wastes.

FIG. 10 is a schematic view of the use of the high-temperature version of the invention to generate high-temperature gases in order to incinerate fuels containing high concentrations of combustible hazardous wastes such as dioxins. The configuration of FIG. 10 is used if the maximum temperature attainable within the combustion bed, typically 1,850° F., is insufficient to provide adequate thermal destruction of the hazardous wastes. Temperatures in excess of 2,200° F. may be achieved by the configuration of FIG. 10.

FIG. 10 may be used when either all of the fuel is a combustible hazardous waste or when a hazardous material is included in an otherwise non-hazardous waste such as MSW. In the preferred embodiment, fuel 54 is injected into drier 236 which is the same as the drier incorporated in FIG. 7. Dried fuel and bed solids are conveyed via duct 262 to pyrolyzer 10'''''', all of whose materials, both solid and gaseous, leave overhead at duct 362. All the solids are separated from the volatiles by cyclone 364, with some of the volatiles being ducted to the afterburner 366 through line 368, with the remainder being ducted in line 370 to fuel sparge pipes 64 in combustor 12.

The amount of volatile matter that is allowed to flow though line 368 is controlled by valves in lines 368 and 370 whose settings are determined by afterburner 366 temperature, with the higher temperatures requiring correspondingly higher flow rates through line 368.

Solids 372 leaving cyclone 364 are ducted to a particle separator, such as a vibrating table (deister table) that removes for disposal the high-density particles, such as metal, from the bed material and char. Such a separator is needed only if a dry RDF process is employed that is less effective than the preferred wet RDF system at removing such metals. Metal removal, particularly of aluminum, is needed if slagging in afterburner 366 is to be avoided.

Solids 376 leaving separator 376 are conveyed to classifier 378 where the coarse particles 380, including bed material and coarse char, are separated from the char fines 382. The char fines are entrained in volatiles 370 and pneumatically conveyed by them to the fuel sparge pipes. The coarse solids are mechanically conveyed to the combustion bed 26 and distributed across it by devices such as spreader 44 of FIG. 1.

The flue gases 116 leaving combustor 12'''''' are mixed in afterburner 366 with volatiles in line 368, plus whatever air 384 is required for the completion of combustion, to create the necessary temperature of the flue gases 386. In some cases, an additional cyclone may be required in line 116 to avoid the slagging of afterburner 366 by flyash created at combustor 12. The particulates removed at this cyclone are removed for disposal from the system.

The preferred embodiment of FIG. 10 uses the wet processed RDF process of FIG. 6 and requires the use of drier 236. It also requires the use of bed solids 386 and 388 to provide the heat from drier 236 and pyrolyzer 10'''''' but eliminates the need for density separator 374. In an alternative embodiment, whereby a dry RDF process is used, the need for drier 336 is eliminated, but particle separator 374 is required. This embodiment is successful only if the dry RDF process is also successful at removing virtually all of the glass in the RDF, such as by the use of trommels. Glass is of a similar density to sand, so density separator 374 is unsuitable for separating glass from the bed material.

A second embodiment with the high-temperature burning of dry-process RDF also eliminates drier 236 and retains separator 374 but differs from the other embodiments by abandoning the use of bed solids 386. Instead, partial oxidation of the RDF fluff by pyrolysis air 76 is used as the source of heat in the pyrolyzer. By avoiding the inclusion of ged materials in density separator 374, the separator may now be used to separate glass as well as metal from the char insofar as the densities of glass and char are substantially different.

UNDER-THE-BED COOLANT TUBES

In conventional fluidized bed combustors, including combustor 10, the coolant tubes are located high in the bed, and in any case above the position at which combustion air is added.

In one embodiment of the invention, the positions are reversed, whereby the coolant tubes are beneath the level at which the combustion air is introduced.

There are several reasons for using the under-the-bed tube configuration. First, it is possible to use lower-BTU fuels. Secondly, the under-the-bed system employs combustion-air sparge pipes instead of distributor plates making it easier to provide bed cleanout of oversize materials. Third, the under-the-bed tubes can be built into taller tube bundles without incurring erosion, therby avoiding the need for the larger burner sizes that would otherwise be required with high-tube-temperature applications such as superheater and combined-cycle air-tube applications. Fourthly, corrosion of the high-temperature tubes is also minimized, leading to longer tube life and less maintenance. Finally, the under-the-bed tubes allow the use of in-bed manifolds which greatly simplifies the problem of leading the hot piping into and out of the burner casing.

More specifically, in the previously described embodiments of combustor 12, the coolant tubes are located in the splash zone near the top of fluid bed 26, being located there so that the immersion of the tubes of the bed, and the resulting heat transfer, may be varied by changes in the flow rate of combustion air 90 or the amount of material in bed 26. This placement of coolant tubes is conventional for both single-bed and multi-bed bubbling-bed fluidized bed combustors.

One embodiment of the invention employs coolant tubes that are located beneath the region where combustion air 90, is introduced rather than above it as in previous embodiments. The reasons for using the under-the-bed configuration are as follows:

For low-BTU fuels, these fuels are those that contain high levels of inert material, such as the rejects from coal mines or the product from low-grade mines. Low-BTU fuels are also those containing high levels of moisture, such as low-rank coals, the tailings from coal mine washing plants, peat, green wood and sewage sludge. Other low-BTU fuels have both high mositure and high levels of ash. All such fuels are difficult to burn in a fluidized bed combustor, as with any burner, when the BTU level reaches a certain level, and as a practical limit, even low-BTU fuels whose moisture content is over 55% are difficult to keep lit in a fluidized bed combustor. This means that many fuels burn only poorly or require expensive auxiliary fuels if they are to be burned.

The theoretical moisture limit for such fuels is a much higher number, however, on the order of 85%, if the optimal combustion conditions were achieved. A key requirement is that heat losses from the combustion zone be reduced to the minimum possible level. But it is impossible to eliminate heat losses if over-the-bed coolant tubes are used, insofar as they absorb heat by radiation, and also by some splashing by bed solids, even if the bed level is low and being operated at a low velocity.

One of the objectives of using under-the-bed coolant tubes is to eliminate this heat loss by making it possible to reduce virtually to zero the amount of heat absorbed by the coolant tubes and thereby increasing the range of fuels that may be burned in a fluidized bed combustor to include the very lowest grades.

Another problem is bed cleanout. Fluidized-bed combustors using distributor plates are subject to clogging and if oversize incombustibles are fed with the fuel, these particles fall to the bottom of the bed, and are difficult to remove with a shutdown. A third problem relates to the use of high temperature tubes and the relation to bed area.

When the fluidized bed combustor is used to generate relatively low temperature fluids, such as saturated steam or hot water, the tube temperatures never reach more than about 500° F., which is a relatively low temperature. When fluidized bed combustors are used to generate high-temperature fluids, such as superheated steam that is used to generate electricity or high-temperature compressed air for use in combined-cycle generating plants, the coolant tube temperatures can reach 1,500° F., nearly as hot as the combustion bed temperature of 1,700° F. As a result, the temperature difference between the bed and the tubes is only 200° F. in the latter case vs. 1,200° F. in the former, a difference of a factor of six.

The lower temperature difference associated with the high-temperature tubes means that far more heat transfer tubing is required in the high temperature case. This results in tube banks that may be two feet or more tall versus a third of that for the low temperature applications.

In addition, for overbed tubes for every foot of tube bank, there must be another foot of space between the distributor and the bottom of the tube bank to provide turndown control. Without this height requirement, the velocity turndown technique that is taught in U.S. Pat. Nos. 4,279,205 and 4,499,857 does not work, and the speed with which the burner can respond to load changes is radically reduced.

Together, these requirements would result in bed depths of several feet in the case of the high-temperature over-the-bed tubes. But such bed depths would result in the formation of relatively large bubbles at the bed surface, caused by the agglomeration and growth of the bubbles that is the normal occurrence in a fluidized bed. The use of such bed depths would cause significant amounts of erosion, and that must be avoided. The violence of the motion of the bed at the surface of the bed increases directly with bed depth, and beyond certain bed depths, causes severe erosion of the in-bed tubes. Avoiding this problem requires that the bed level be limited to a relatively low level to obtain the required amount of tube area while staying within the shallow bed depth limits, the bed area must be increased by as much as a factor of two, thereby doubling the size of the burner and appreciably adding to its cost.

Another problem with the prior art tube arrangements is manifolding. The steam or air enters and leaves the in-bed tubes at headers and manifolds, which then duct the fluid out of the burner casing. The connections of the tubes to the headers is typically a geometrically irregular shape, and such shapes are traditionally high-erosion centers within fluidized bed combustors. For this reason headers are usually located outside the of the burner casing to avoid the problem.

This is impractical with high-temperature tubes, however, because the thermal expansion of the tubes is several times that of the surrounding water-cooled casing. The manifolding of the tubes therefore represents a significant technical difficulty in these applications.

Figure 11:
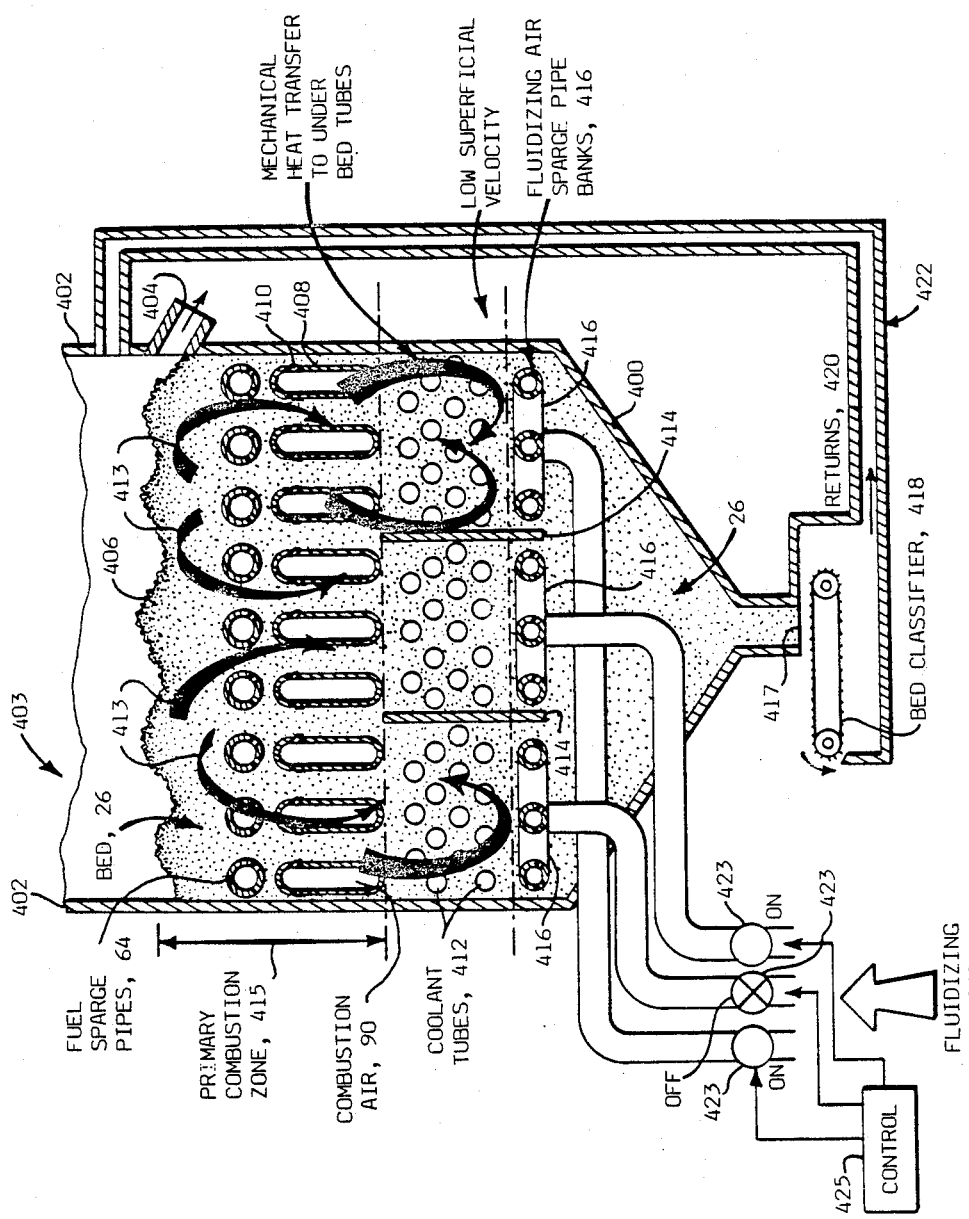
FIG. 11 is a diagrammatic view of the under-the-bed coolant tubes in the combustion bed of a fluidized bed combustor.

In order to solve these problems, and referring to FIG. 11, this Figure is a diagrammatic view of the preferred embodiment of the combustion bed with under-the-bed coolant tubes. The elements of FIG. 11 replace the elements of fluidized combustor 12 as depicted in FIG. 1 from the bottom 20 to the top of the bed 26. Replaced, in addition to combustor bottom 20, are inlet manifold 94, combustion bed distributor assembly 24 and over-the-bed coolant tubes 100. Included in both FIG. 1 and FIG. 11 are fuel sparge pipes 64 and a combustion bed 26. No other elements of combustor 12 in FIG. 1 are affected by the use of the under-the-bed coolant tubes.

The under-the-bed embodiment includes hopper 400 and rectangular walls 402 which together form the bottom of a gas-tight vessel 403. The vessel is filled with bed material 26, mostly sand, from the bottom of hopper 400 to overflow 404 which establishes the top surface 406 of bed 26. Several inches below bed surface 406, typically 9 to 12 inches, are fuel sparge pipes 64.

Immediately below fuel sparge pipes 64 are combustion air sparge pipes 408 through which most of the air needed for combustion is injected into the bed through downward-sloping orifices 410. The combustion air sparge pipes are elongated in the vertical direction to permit adequate passage area between them while providing enough internal area to minimize the air pressure drop and provide for a uniform distribution of the air into the bed. Typical dimensions of the sparge pipes used to cover a ten-foot wide bed are five-inch width by ten-inch height on nine-inch centers.

As an alternative to the use of elongated combustion bed sparge pipes is the use of a single row of circular pipes which are used in short bed widths and two or more rows of circular pipes, which are used in wider beds. Two rows of six-inch pipes would be approximately equivalent to the elongated sparge air pipes of FIG. 11.

Below the combustion-air sparge pipes are coolant tubes 412 through which are pumped water, steam, compressed air or other fluids to be heated. The tubes are divided into tube banks, a tube bank being defined as an array of tubes separated by separators 414. Below the coolant tubes are banks of fluidizing air sparge pipes 416, below which is hopper 400.

At the bottom of hopper 400 is an outlet 417 through which bed material is allowed to flow at a controlled uniform or intermittent rate onto bed-grading classifier 418 where oversized bed material 420 is removed from the system. The remaining bed material is returned to the combustion bed by conveyor system 422. A solids cooler (not shown) may also be required between the bottom of hopper 400 and entrance of classifier 418 to protect the classifier from overheating.

It should be noted that the coolant tubes are basically at the bottom of the bed instead of at the top. This means that they are, in general, below a primary combustion zone 415 which extends above any fuel feed point within the bed or, if combustion air is injected above the bottom of the bed, the primary combustion zone is above the combustion air introduction point.

In operation, the combustion bed is preheated by preheat burner (not shown) that introduces high-temperature gases (to 1,700° F.) through sparge pipes 408, thereby heating the bed to the fuel ignition temperature. At this point, fuel is fed to the pyrolyzer, which creates volatiles and char that are fed to combustion bed 26 at fuel sparge pipes 64 and by a conveyor. Alternatively, because of the ability to handle wet fuels, these fuels may be injected directly over the pyrolyzer bed. The remaining steps of bringing the system to the operating temperature are the same as those of the embodiment of FIG. 2.

When the bed approaches the design-point temperature, fluidizing air sparge pipes 416 are turned on at valves 423 under the control of unit 425, one tube bank at a time. This fluidizes the previously unfluidized material between fluidizing air separators 414 and the top of combustion air sparge pipes 408, creating a fluidized zone that reaches to the top 406 of bed 26. Enough air is added at pipes 416 to vigorously fluidize the material in the tube banks, but not more; typically, the superficial velocity within the tube banks is twice the minimum fluidization velocity.

This in turn creates circulation and mixing of the solids for the entire height, bringing solids heated by combustion to the vicinity of coolant tubes 412, and heating them by the turbulence caused by fluidization. The amount of heat removed is controlled by the number of tube banks that are fluidized. A particular tube bank is either fluidized or not at any time. Separators 414 extend vertically far enough to avoid the fluidization of any tube bank by the air introduced by an adjacent set of fluidizing-air sparge pipes.

At the maximum firing rate, and with high-BTU fuels, all of the tube banks are fluidized (except those that provide a capacity margin.) Control of the system is as follows. As the heat demand drops, as reflected in rising steam pressures or dropping steam flows in the case of a boiler, one or more tube banks are defluidized by shutting off the fluidizing air. With fluidization stopped, the tube bank no longer receives any heat, and it stops withdrawing any heat from the bed. Water flow through the coolant tubes continues to be circulated from and to the steam drum to protect them from overheating, but they stop making any steam after fluidization is stopped.

Simultaneously with the reduction in the number of fluidized tube banks, the fuel flow and total airflow (combustion airflow plus fluidizing airflow) are reduced; otherwise, combustion-bed 26 would heat up. The reverse procedure is used during load increases.

When the coolant tubes are used to heat superheated steam or compressed air, the same control procedure is used, but the steam or air flow rate to the tube banks is controlled to otherwise provide a uniform outlet temperature form each tube bank. Otherwise, the air passing through a defluidized tube bank would emerge at a low temperature, which would cool the remaining air, an undesirable result.

Enough tube banks are used to provide relatively small gradations in the heat removal when any particular tube bank is turned ON or OFF. In principal, as many as thirty tube banks would be required to give 1½% steps in the degree of heat removal. The use of unevenly sized tube banks would reduce the number of banks and their associated valving, but could lead to temperature nonuniformities across them for the larger sizes. A compromise configuration that also provides 1½% resolution may consist of four tube banks each of which absorbs 20% of the system's capacity, plus tube banks rated at 12, 6, and 3% that can be used to fine-tune the heat removal.

All of the rows of tubes are substantially horizontal, except for the headers. The rows of tubes are separated from each other by as little as is practical, typically an inch or two. Fluidizing air emerging from the fluidizing-air sparge pipes is sufficiently unsymmetrical to encourage circulation within the tube banks.

The way in which under-the-bed tubes solve the above-mentioned problems is as follows.

For low-BTU fuels, the use of the under-the-bed coolant tubes thus solves the problems identified above. With regard to low-BTU fuels, under-the-bed tubes reduce heat losses to the irreducible minimum. When a tube bank is defluidized, it receives heat from the upper portions of the bed only by thermal conduction, which is neglible in the defluidized sand. Other factors promoting the use of low-BTU fuels in the invention include the use of the fuel sparge pipes, whose spacing is typically half that of the bed depth, so the fuel burns within the bed.

Also, the walls of the combustor freeboard are insulated and relatively short, typically only 5–10 ft. This combination further reduces thermal losses from the bed. The short freeboard height is made possible by the use of the relatively shallow bed, whose small depth minimizes the size and violence of the bubbles emerging from the bed, thus reducing the height required to prevent their being lost overhead. Together, these methods significantly increase the moisture or inert level in a fuel that can still be burned.

With respect to bed cleanout the deletion of the combustion bed distributor plate 24 made possible by the use of combustion-air sparge pipes in the under-the-bed coolant tubes configuration makes it feasible to continuously cull the oversize particles from the bed material and enable the bed to always be well fluidized. Use of combustion-air sparge pipes for this purpose is known to the art.

Regarding high temperature tubes and its relationship to bed area, use of the under-the-bed coolant tube configuration greatly reduces the potential for tube erosion, for two reasons. First, the need for a space between the bottom of the tube bank and the air supply, whose height is approximately equal to that of the tube bundle in the over-the-bed tube configuration, is eliminated in the under-the-bed configuration. Instead, the tube bundle starts immediately over the fluidizing-air sparge pipes. By allowing this space to be filled with tubes, the same overall height limitation to the top of the tube bundle can now contain twice as many tubes, thereby eliminating the double of bed area that was associated with the use of high-temperature over-the-bed tubes.

Bubble growth in the fluidized bed and the resulting erosion is also greatly affected by superficial velocity. With the under-the-bed tube configuration, the superficial velocity in the tube bank is held to a minimum, which further reduces the tendency to erosion.

Together, these effects allow the ues of tall enough tube banks, typically 3 feet tall, to permit the maximum desirable firing rate of 500,000 BTU/hr-ft$^2$, thereby avoiding the oversized burner that would be required with the use of over-the-bed tubes.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for generating heat, said apparatus comprising:
    a fluidized bed pyrolyzer comprising:
        a pyryolyzer vessel;
        means for supporting a pyrolyzer bed of granular material within said pyrolyzer vessel;
        means for fluidizing said pyrolyzer bed;
        means for adding fuel to said pyrolyzer bed;
        means for removing gaseous effluents from said pyrolyzer vessel; and
        means for removing bed material from said pyrolyzer bed;
    a fluidized bed combustor comprising:
        a combustor vessel;
        means for supporting a combustor bed of granular material within said combustor vessel;
        means for adding the gaseous effluents removed from said pyrolyzer bed to said combustor bed;
        means for adding granular material to said combustor bed;
        means for removing gaseous effluents from said combustor vessel;
        means for removing bed material from said combustor;
    a heat exchanger comprising a vessel; means for ading gaseous effluents to, and means for removing gaseous effluents from, said heat exchanger vessel, and means for adding an exchange coolant to, and means for removing an exchange coolant from, said heat exchanger vessel;
    particulate collector means connected to said heat exchanger for removing particulate matter from said gaseous effluents removed from said heat exchanger; and
    stack means connected to said particulate collector for releasing said gaseous effluents removed from said heat exchanger to the atmosphere;
    means for conveying gaseous effluents from said pyrolyzer to said combustor bed;
    means for conveying combustor bed material from said combustor bed to said pyrolyzer at a rate sufficient to pyrolyzer said fuel;
    means for conveying pyrolyzer bed material from said pyrolyzer bed to said combustor bed at a rate sufficient to maintain the bed level in the pyrolyzer at a predetermined level; and
    means for conveying gaseous effluents from said combustor vessel to said heat exchanger;
    a second fluidized bed located within said combustor vessel;
    said second combustor bed being supported by a distributor plate mounted within said combustor vessel;

said second fluidized bed being located above the freeboard of said combustion bed;

means for conveying said effluent gases leaving said combustor bed to said second fluidized bed through passages in said second bed distributor plate;

means for conveying said effluent gases leaving said second bed to said heat exchanger;

means for adding solids to said second bed; and means for removing solids from said second bed.

2. The apparatus of claim 1, wherein said second bed is cooled to a sufficiently low temperature that hydrogen chloride is significantly removed by the addition of calcium carbonate to said second bed.

3. The apparatus of claim 1, wherein air is added below said distributor plate of said second bed.

4. Apparatus of claim 1 wherein said solids added to said second bed contain calcium carbonate as the principle chemically active ingredient.

5. The apparatus of claim 4, wherein the source of calcium carbonate is dolomite.

* * * * *